United States Patent
Asai et al.

(10) Patent No.: US 8,111,428 B2
(45) Date of Patent: Feb. 7, 2012

(54) HALFTONE IMAGE GENERATION METHOD, THRESHOLD MATRIX GENERATION METHOD, THRESHOLD MATRIX, PRINTING PLATE MANUFACTURING METHOD, AND PRINTING PLATE

(75) Inventors: Hiroshi Asai, Kyoto (JP); Yuji Kurokawa, Kyoto (JP); Masaru Wakui, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 520 days.

(21) Appl. No.: 12/398,490

(22) Filed: Mar. 5, 2009

(65) Prior Publication Data

US 2009/0262398 A1    Oct. 22, 2009

(30) Foreign Application Priority Data

Apr. 17, 2008  (JP) ................ P2008-107584

(51) Int. Cl.
  *H04N 1/405* (2006.01)
  *B41C 1/00* (2006.01)
(52) U.S. Cl. ............. 358/3.06; 358/3.09; 358/3.17; 358/3.3
(58) Field of Classification Search ............ 385/3.09, 385/3.11, 3.12, 3.17, 3.3
  See application file for complete search history.

(56) References Cited

U.S. PATENT DOCUMENTS

| | | | |
|---|---|---|---|
| 4,187,107 A * | 2/1980 | Homma et al. | 430/307 |
| 7,126,724 B2 | 10/2006 | McCrea et al. | |
| 7,245,402 B2 | 7/2007 | McCrea et al. | |
| 7,457,004 B2 * | 11/2008 | Asai et al. | 358/3.06 |
| 7,492,480 B2 * | 2/2009 | Russell | 358/3.09 |
| 2003/0048477 A1 | 3/2003 | Russell | |
| 2009/0147315 A1 * | 6/2009 | Russell | 358/3.06 |

FOREIGN PATENT DOCUMENTS

| | | |
|---|---|---|
| EP | 1 435 728 | 7/2004 |
| EP | 1 519 565 | 3/2005 |
| EP | 1 557 279 | 7/2005 |
| EP | 1 684 499 | 7/2006 |
| WO | 03/019929 | 3/2003 |

OTHER PUBLICATIONS

Schreiber, W.F., "Fundamentals of Electronic Imaging Systems: Some Aspects of Image Processing," Third Edition, Springer-Verlag, New York (May 1, 1993).
European Search Report issued Jul. 8, 2009 in connection with corresponding European Patent Application No. 09003401.8.

* cited by examiner

*Primary Examiner* — Scott A Rogers
(74) *Attorney, Agent, or Firm* — Ostrolenk Faber LLP

(57) ABSTRACT

In a halftone image formed on a printing plate for letterpress printing, a minimum halftone dot has a square main cluster consisting of 9 pixels and four sub-clusters located around the main cluster radially, each of which is one pixel. Each sub-cluster contacts with only a vertex of the main cluster. Convex portions corresponding to the minimum halftone dots in the halftone image are formed on the printing plate. A convex portion corresponding to the main cluster is supported by convex portions corresponding to the sub-clusters to increase the strength of relief corresponding to the minimum halftone dot. Reliefs corresponding to the minimum halftone dots are normally formed regardless of a dot area rate of highlight area to thereby improve reproduction in printing of the halftone image.

18 Claims, 20 Drawing Sheets

HALFTONE IMAGE GENERATION METHOD, THRESHOLD MATRIX GENERATION METHOD, THRESHOLD MATRIX, PRINTING PLATE MANUFACTURING METHOD, AND PRINTING PLATE

BACKGROUND OF THE INVENTION

1. Field of the Invention

The present invention relates to a halftone image generation method of generating a halftone image formed on a printing plate for letterpress printing, a threshold matrix which is compared with a grayscale original image in generating a halftone image, and a threshold matrix generation method. The present invention is also relates to a printing plate for letterpress printing and a printing plate manufacturing method.

2. Description of the Background Art

Conventionally, letterpress printing such as flexography has been performed in commercial printing, and a printing plate for letterpress printing is manufactured by using a technique of CTP (computer to plate) or the like. In manufacturing the printing plate for letterpress printing, for example, laser beams are applied (irradiated) to a mask layer laminated on a photosensitive resin layer by using the CTP, and openings corresponding to a halftone image generated from a grayscale (i.e., continuous tone) original image are formed in the mask layer. UV (ultraviolet) light is applied (irradiated) to the photosensitive resin layer through the openings formed in the mask layer to cure exposed portions of the photosensitive resin layer, and then a development process of removing the mask layer and non-cured portions of the photosensitive resin layer is performed to form a printing plate where convex portions corresponding to the halftone image are formed on its surface.

To create a halftone image for printing from a grayscale original image, for example, an AM (Amplitude Modulated) screening where gray levels are represented by changing the size of dots which are regularly arranged (accurately, the halftone dots are clusters each of which is a group of dots (or pixels) connecting one another), has been used. Actually, a threshold matrix in which a plurality of elements are arranged in a row direction and a column direction and a threshold value is assigned to each element, is prepared and generated in advance, and a halftone image used in printing is generated by comparing the original image with the threshold matrix.

In the letterpress printing, in a case where the size of minimum halftone dots is small or the screen ruling of halftone dots is small (i.e., the pitch of halftone dots is large), reliefs formed on a printing plate become narrow or small in a highlight area having a small dot area rate (i.e., a low density of halftone dots) in the printing plate. This results in causing failure in the formation of reliefs where the reliefs are bended by lack of the strength of reliefs in the development process in manufacturing of the printing plate or the like, and results in reducing reproduction in printing for appropriately representing the original image in a printed image. Reproduction in printing may be reduced with the reliefs being bended by pressure in printing.

The phenomenon that the reliefs become small in the highlight area can be solved by making the size of minimum halftone dots larger than the size of pixels in the minimum resolution by using a threshold matrix shown in FIG. 6.24 of pp. 168 to 170 of "Fundamentals of Electronic Imaging Systems" by F. W. Schreiber, U.S.A. the third edition, Springer-Verlag New York, May 1, 1993 (Document 1).

U.S. Pat. No. 7,126,724 (Document 2), U.S. Pat. No. 7,245,402 (Document 3), European Patent Application Laid-Open No. 1,557,279 (Document 4), and European Patent Application Laid-Open No. 1,684,499 (Document 5) disclose a technique for increasing the strength of reliefs where dots for reinforcing a relief are formed at a position apart from the relief. The dots for reinforcing are convex portions which are lower than the relief for printing and not included in a target for printing. US Patent Application Publication No. 2003/48477 (Document 6) discloses a technique for changing the shape of each halftone dot into a cross between the highlight area and an area of middle gray levels (i.e., in an area between the highlight area and a shadow area having a large dot area rate).

If the size of minimum halftones dots is increased as disclosed in Document 1, since the number of halftone dots included in the highlight area is reduced to maintain a desired dot area rate, the pitch of halftone dots becomes large and the strength of reliefs is decreased. As a result, reproduction in printing is reduced.

In Documents 2 to 5, although the dots for reinforcing are not included in a target for printing, there is a possibility that the height of dots for reinforcing becomes equal to that of the reliefs for printing in such a case where intensity of light which is applied to portions to be dots for reinforcing is larger than a desired intensity in forming a printing plate, and the dots for reinforcing which should not be normally printed are printed (so-called scumming occurs). On the other hand, in a case where the intensity of light which is applied to the portions to be dots for reinforcing is smaller than the desired intensity in forming the printing plate, the dots for reinforcing become smaller than necessary and the reliefs are not fully reinforced, and thereby the strength of reliefs may be decreased. In both cases, reproduction in printing is reduced.

In Document 6, since the shape of halftone dot is changed into a cross also in the area of middle gray levels, the length of circumference of halftone dot is longer. Therefore, a printed dot becomes thicker or thinner by a slight change of printing pressure in printing, and reproduction in printing is reduced.

SUMMARY OF THE INVENTION

The present invention is intended for a halftone image generation method of generating a halftone image which is formed on a printing plate for letterpress printing. It is an object of the present invention to improve reproduction in printing of the halftone image by increasing the strength of reliefs corresponding to minimum halftone dots in the halftone image.

The halftone image generation method according to the present invention comprises the steps of: forming minimum halftone dots each of which consists of three or more pixels at predetermined halftone dot-central positions in a halftone area included in a halftone image generation space corresponding to a grayscale area included in a grayscale original image so that a density of minimum halftone dots is increased as a gray level of the grayscale area becomes higher, gray levels of the grayscale area being equal to or lower than a mode switching gray level which is determined, in advance, as a gray level close to the lowest gray level where any halftone dots do not exist; and forming halftone dots which grow from minimum halftone dots as a gray level of the original image becomes higher, at halftone dot-central positions in another halftone area included in the halftone image generation space corresponding to another grayscale area included in the original image, gray levels of the another grayscale area being higher than the mode switching gray level, wherein each of the minimum halftone dots comprises: a rectangular main cluster consisting of two or more pixels; and a sub-cluster located around the main cluster, the number of pixels of the sub-cluster being smaller than that of the main cluster, and the sub-cluster is one pixel or a plurality of pixels arranged approximately in a direction which extends from the main cluster, and only a vertex of the sub-cluster contacts with the main cluster or only a side of the sub-cluster contacts with a side of the main cluster, the side of the sub-cluster being shorter than the side of the main cluster. According to the present invention, it is possible to increase the strength of reliefs corresponding to the minimum halftone dots in the halftone image to be formed on the printing plate for letterpress printing, and as a result, reproduction in printing of the halftone image can be improved.

According to a preferred embodiment of the present invention, the mode switching gray level is $100 \times C/((A/B) \times (A/B))$ % of G, where A is a resolution of a generated halftone image, B is a screen ruling of halftone dots per unit length corresponding to the resolution, C is the number of pixels of a minimum halftone dot, and G is the number of gray levels from the lowest gray level to the highest gray level.

According to another preferred embodiment of the present invention, the sub-cluster is smaller than the main cluster in a first direction parallel to a pair of sides of the main cluster and is smaller than the main cluster in a second direction perpendicular to the first direction.

According to still another preferred embodiment of the present invention, the sub-cluster is a plurality of pixels arranged in line.

According to still another preferred embodiment of the present invention, the minimum halftone dot further has three sub-clusters which are the same form as the sub-cluster and located around the main cluster radially, together with the sub-cluster.

The present invention is also intended for a threshold matrix which is compared with a grayscale original image in generating a halftone image to be formed on a printing plate for letterpress printing and a threshold matrix generation method. The present invention is still also intended for a printing plate for letterpress printing and a printing plate manufacturing method of forming a halftone image on a printing plate.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
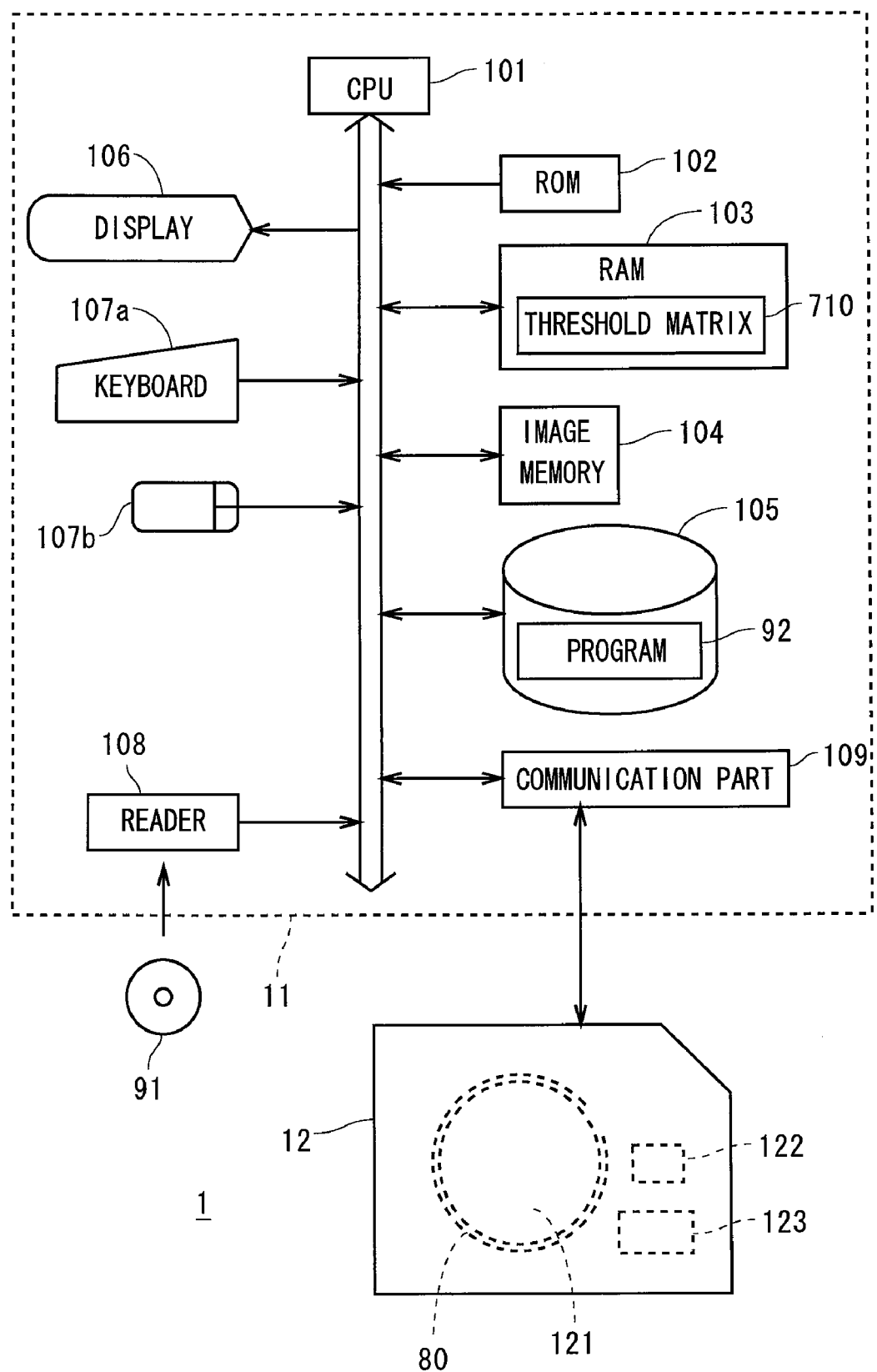
FIG. 1 is a view showing a constitution of an image recording system in accordance with a preferred embodiment of the present invention.

FIG. 1 is a view showing a constitution of an image recording system 1 in accordance with a preferred embodiment of the present invention. The image recording system 1 has a computer 11 and an image recording apparatus 12, and the image recording apparatus 12 receives signal outputted from the computer 11 and records halftone dots on a plate member serving as a printing plate for letterpress printing by using light beams produced by a multichannel laser or the like.

The computer 11 has a structure of general computer system where a CPU 101 for performing various computations, a ROM 102 for storing a basic program and a RAM 103 for storing various information are connected to a bus line. To the bus line, an image memory 104 for storing data of a grayscale image (hereinafter, referred to as "original image") to be represented by halftoning (halftone dots), a fixed disk 105 for storing information, a display 106 for displaying various information, a keyboard 107a and a mouse 107b for receiving an input from an operator, a reader 108 which reads information from a computer-readable recording medium 91 such as an optical disk, a magnetic disk or a magneto-optic disk, and a communication part 109 for making communications with the image recording apparatus 12 are further connected through interfaces (I/F) as appropriate.

The image recording apparatus 12 has a drum 121 holding a plate member 80 on its side surface, a writing head 122 for outputting light beams which are modulated in multichannel towards the plate member 80, a signal generation circuit 123 for generating signal of a halftone image to be transmitted to the writing head 122, a driving mechanism for moving the writing head 122 relatively to the plate member 80 by rotating the drum 121 and moving the writing head 122 along a rotation axis of the drum 121, and the like. The plate member 80 is formed by laminating a mask layer on a photosensitive resin layer having UV (ultraviolet) curability (i.e., the photosensitive resin layer is insoluble by irradiation with UV light). In the following discussion, a "pixel" refers to one unit for recording (writing) in the image recording apparatus 12 and corresponds to one spot by one light beam.

In the computer 11, a program 92 is read out from the recording medium 91 through the reader 108 in advance and stored in the fixed disk 105. The program 92 is copied in the RAM 103, the CPU 101 performs a computation according to the program 92 in the RAM 103 (that is, the computer 11 executes the program), to generate a later-discussed threshold matrix (SPM (Screen Pattern Memory) data) 710 for forming halftone dots. The threshold matrix 710 and the data of the grayscale original image stored in the image memory 104 are transmitted to the image recording apparatus 12 through the communication part 109, and a signal of a halftone image representing the original image (halftone image data) is generated by the signal generation circuit 123 in the image recording apparatus 12. Light beams are applied (irradiated) to the mask layer of the plate member 80 on the basis of the halftone image data while moving the writing head 122 relatively to the plate member 80, to thereby form openings corresponding to the halftone image in the mask layer of the plate member 80. In other words, the halftone image is written on the mask layer by ablation writing by irradiation with the light beams.

Figure 2:
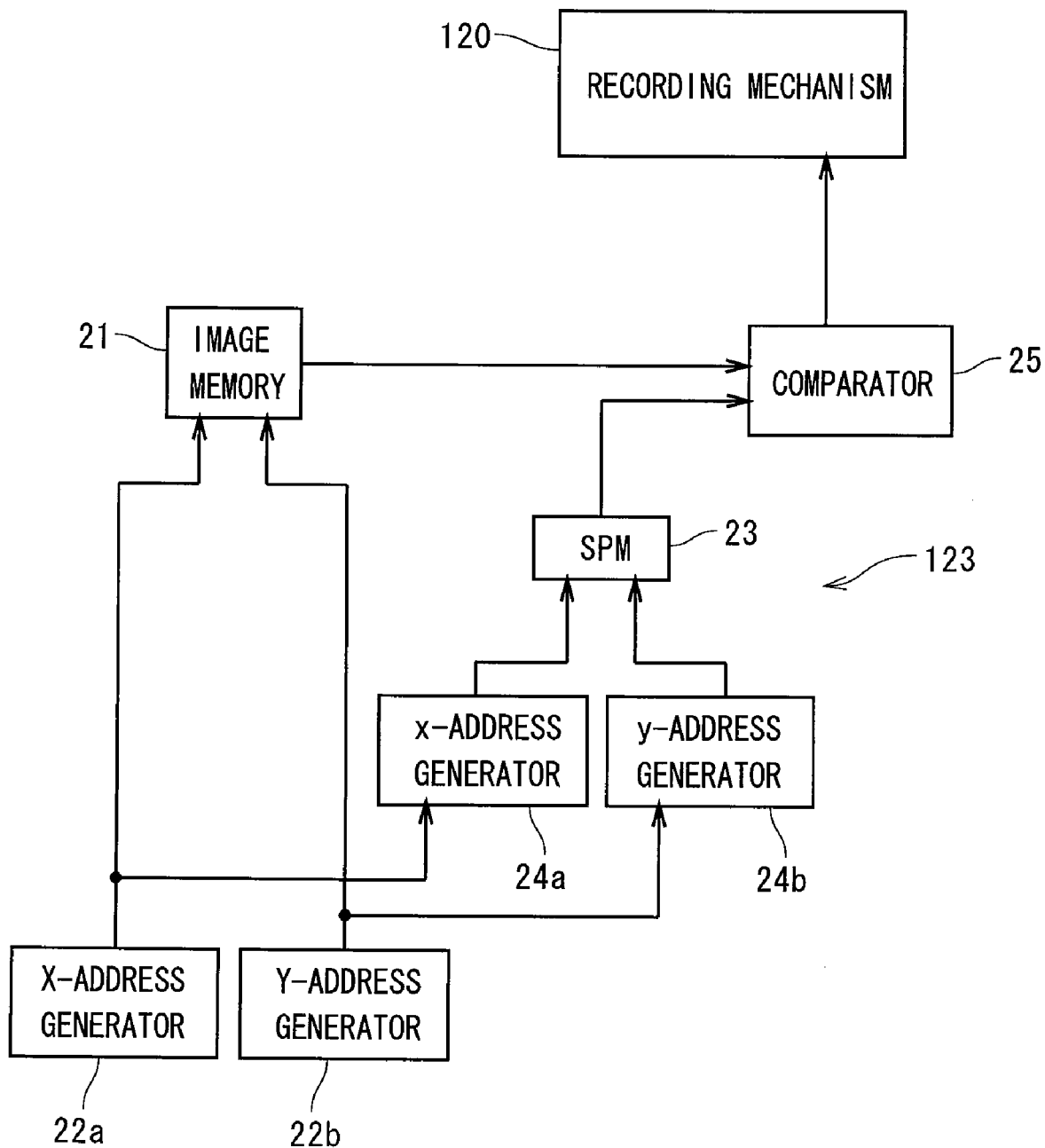
FIG. 2 is a block diagram showing a signal generation circuit and a recording mechanism.

FIG. 2 is a block diagram showing constituent elements of the signal generation circuit 123 in the image recording apparatus 12 and a recording mechanism 120. The recording mechanism 120 corresponds to the drum 121, the writing head 122, a mechanism for driving these elements, a circuit for controlling these elements or the like.

The signal generation circuit 123 has an image memory 21 for storing the data of the grayscale original image, an X-address generator 22a and a Y-address generator 22b for generating a subscan address (X address) and a main scan address (Y address) of the original image, respectively, an SPM (Screen Pattern Memory) 23 which is a recording medium for storing the threshold matrix 710 generated by the computer 11, an x-address generator 24a and a y-address generator 24b for generating a subscan address (x address) and a main scan address (y address) of the threshold matrix 710, respectively, and a comparator 25.

Figure 3:
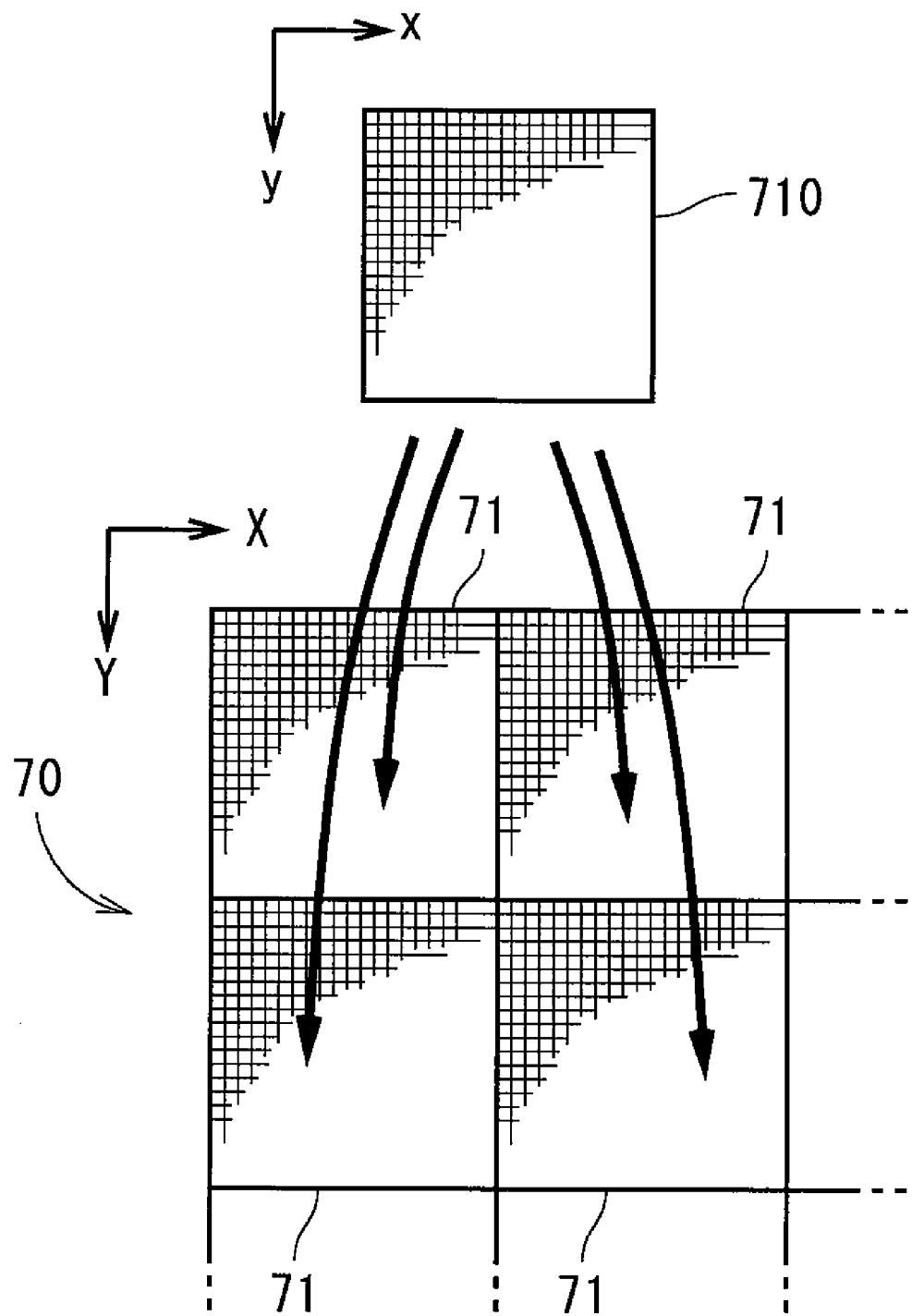
FIG. 3 is a view showing repeat areas and a threshold matrix.

In creating halftone dots of the original image (i.e., in generating the halftone image representing the original image), as shown in FIG. 3, the original image 70 is divided into a large number of areas having the fixed size to set repeat areas 71 each of which serves as a unit in halftoning. The SPM 23 has a matrix space (matrix area) which is a storage area that corresponds to one repeat area 71, and sets a threshold value for each address in the matrix space (i.e., each address is coordinates in the matrix space corresponding to each pixel in the repeat area 71, and hereinafter also referred to as a pixel in the matrix space), to thereby generate the threshold matrix 710.

Then, conceptually, each repeat area 71 of the original image 70 and the threshold matrix 710 are superposed and the gray level of each pixel in the repeat area 71 is compared with a threshold value in the threshold matrix 710 corresponding to the pixel, to thereby determine whether or not writing should be performed (i.e., whether or not a laser beam should be applied) on the position of the pixel on the plate member 80 which is a halftone dot recording medium. Therefore, if the gray level of the original image 70 is uniform, writing is performed on a pixel having an address where a threshold value smaller than the gray level is set in the threshold matrix 710 and macroscopically, uniform halftone dots are generated. Actually, since the original image 70 has gradation (i.e., portions having various gray levels), the halftone dots vary in the repeat area 71 in accordance with the gradation in the original image 70.

Figure 4A:
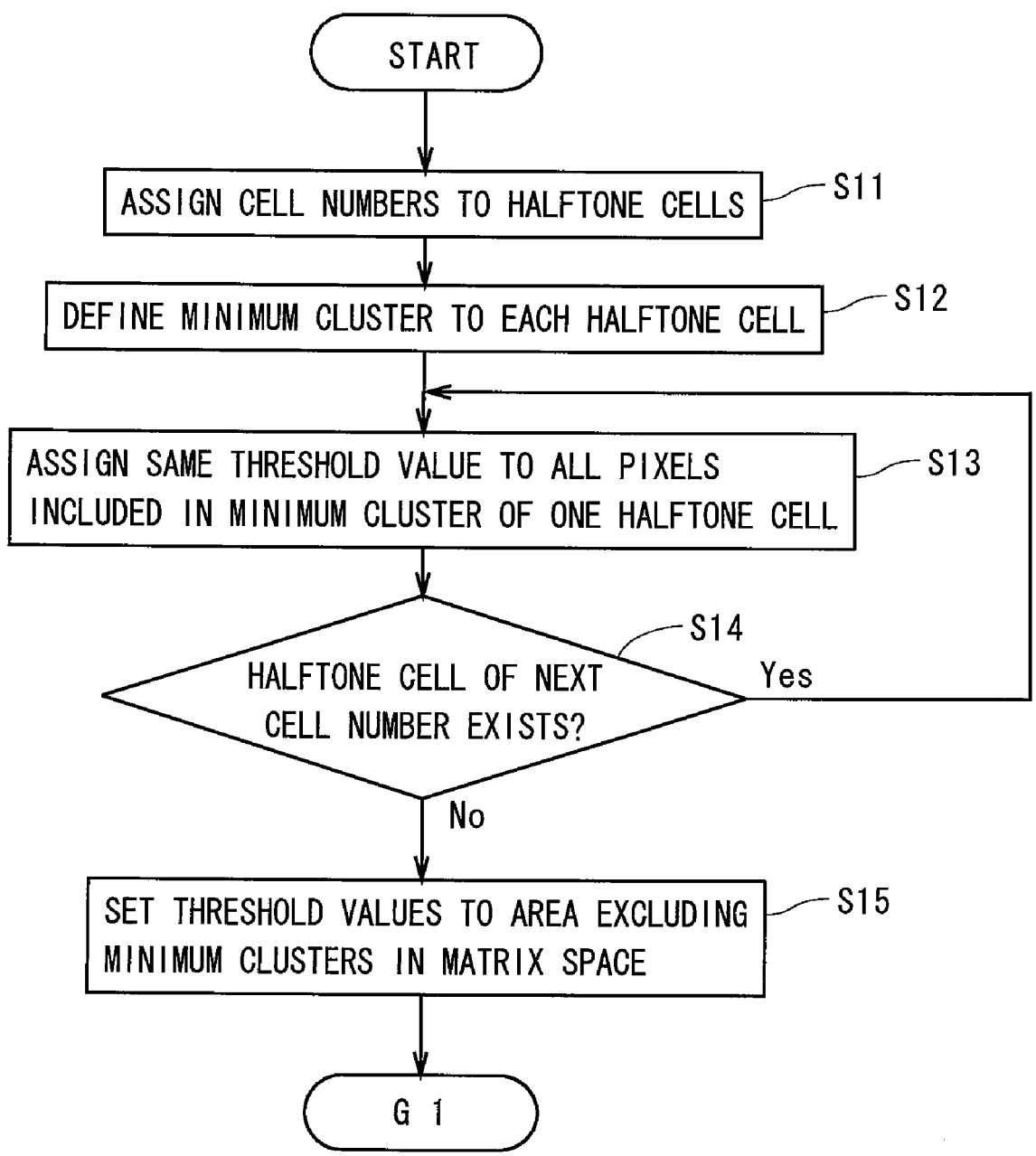
FIGS. 4A and 4B are flowcharts showing an operation flow of the image recording system.
Figure 4B:
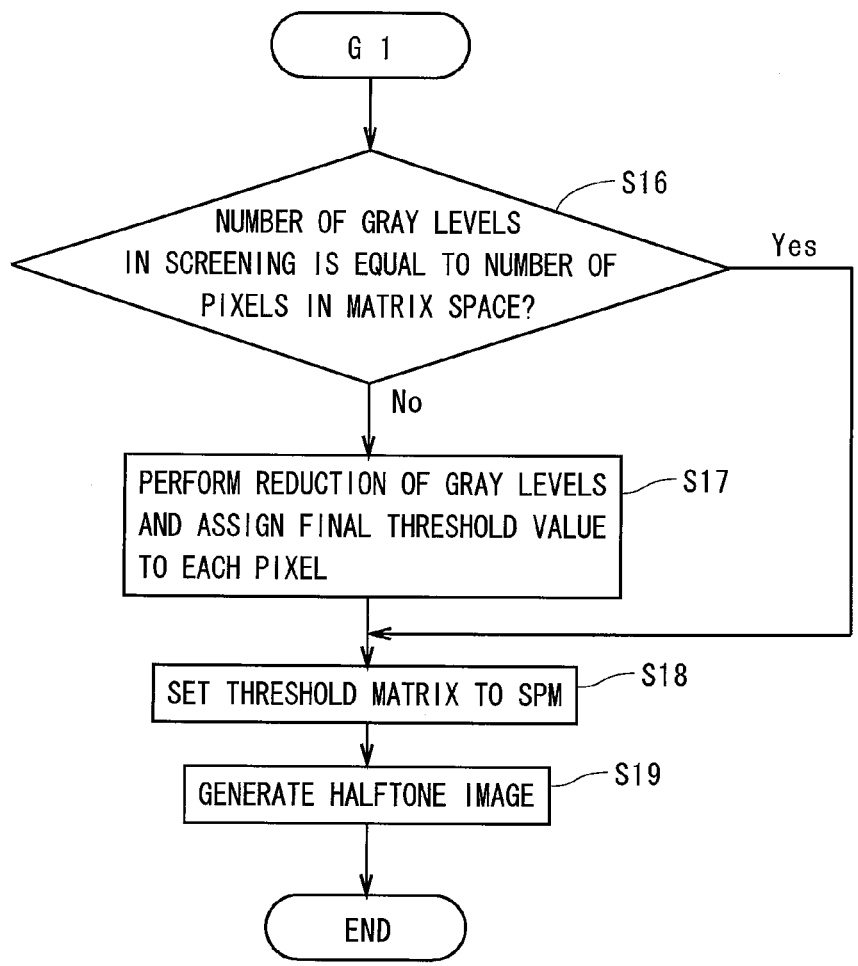
Figure 5:
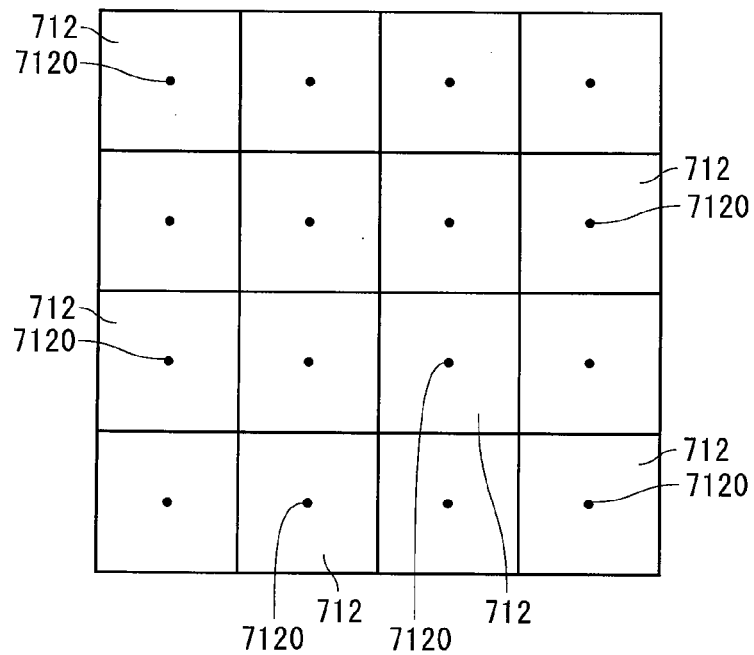
FIG. 5 is a view showing a plurality of halftone cells.

FIGS. 4A and 4B are flowcharts each showing an operation flow of the image recording system 1. In the following description, a halftone image is generated by using the AM (Amplitude Modulated) screening where gray levels are represented by changing the size of halftone dots which are regularly arranged. In the present preferred embodiment, a resolution of a generated halftone image A is 2400 (dpi), and the screen ruling of halftone dots B per unit length (1 inch) corresponding to the resolution A is 150. As shown in FIG. 5, the shape of halftone cells 712 each of which serves as a unit of an area where a halftone dot is formed is a square.

Figure 6:
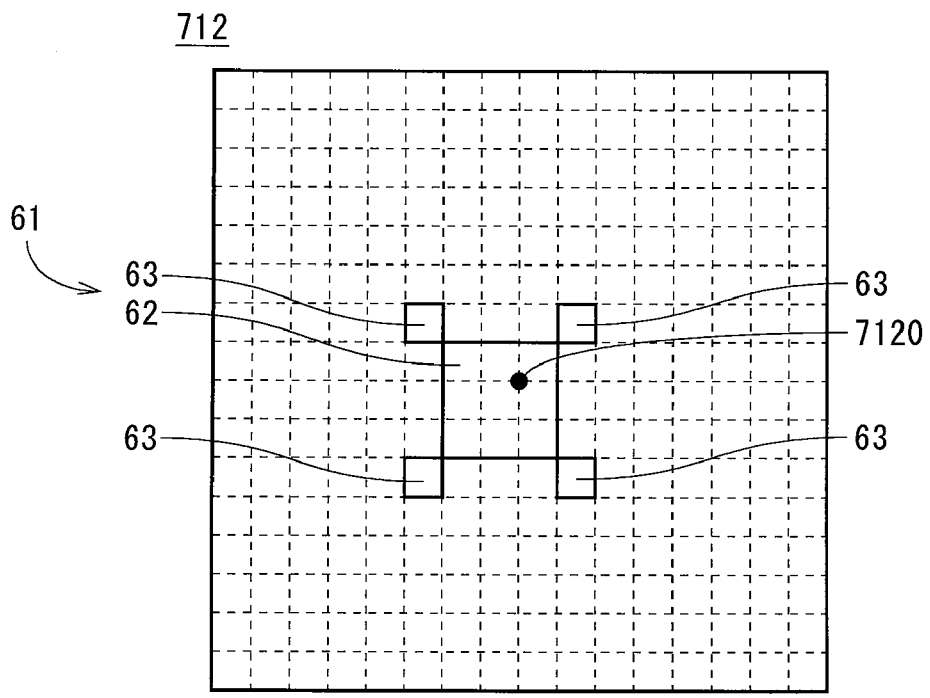
FIG. 6 is a view showing one halftone cell.

As shown in FIG. 6, the length of one side of the halftone cell 712 is 16 pixels, and the number of pixels included in one halftone cell 712 is 256. In FIG. 6, an outline of each pixel is represented by a broken line for easy understanding of illustration (the same is applied in FIG. 8, FIGS. 14A to 14C, and FIGS. 15A to 15I). As shown in FIG. 5, the matrix space where the threshold matrix 710 is generated has 16 halftone cells 712 arranged in a square form, and the number of pixels included in the matrix space is 4096 in the preferred embodiment.

When halftone dots are recorded on the plate member 80 in the image recording system 1 shown in FIG. 1, first, generation of the threshold matrix 710 is performed. In generation of the threshold matrix 710, one halftone cell 712 (in the preferred embodiment, an uppermost-left halftone cell 712 in FIG. 5) is selected from the 16 halftone cells 712 included in the matrix space shown in FIG. 5, a cell number "1" is assigned to the one halftone cell 712. Subsequently, an evaluation value is obtained for each of cell centers 7120 of the remaining 15 halftone cells 712 as to become smaller as the distance between the each cell center 7120 and a cell center 7120 of the halftone cell 712 having the cell number "1" becomes longer, and a cell number "2" is assigned to a halftone cell 712 whose evaluation value is minimum (i.e., a halftone cell 712 which is farthest from the halftone cell 712 having the cell number "1").

Actually, since the repeat area 71 is spatially repeated both in the horizontal and vertical directions in the original image 70, four threshold matrixes 710 are arranged in a square form in calculation of evaluation values, and an evaluation value is obtained on the basis of the distance between a cell center 7120 of a target halftone cell 712 whose evaluation value should be obtained and a cell center 7120 of a halftone cell 712 which is farthest from the target halftone cell 712 out of cell centers 7120 of four halftone cells 712 having the cell number "1". An evaluation value is, for example, obtained as an inverse number of the square of the distance between a cell canter 7120 of a halftone cell 712 where the evaluation value is obtained and a cell center 7120 of a halftone cell 712 having the cell number "1".

Subsequently, a cell number "3" is assigned to a halftone cell 712 farthest from the halftone cell 712 having the cell number "2", and a cell number "4" is assigned to a halftone cell 712 farthest from the halftone cell 712 to which the cell number "3" is assigned. Then, cell numbers "1" to "16" are sequentially assigned to the 16 halftone cells 712 (Step S11). In the present embodiment, cell numbers "1", "9", "3", "11" are sequentially assigned to the uppermost four halftone cells 712 from left to right, and cell numbers "13", "5", "15", "7" are sequentially assigned to the second four halftone cells 712 from left to right. Cell numbers "4", "12", "2", "10" are sequentially assigned to the third four halftone cells 712 from left to right, and cell numbers "16", "8", "14", "6" are sequentially assigned to the lowermost four halftone cells 712 from left to right.

After assignment of the cell numbers, a minimum cluster 61 consisting of 13 pixels is defined at a location including the cell center 7120 in the halftone cell 712 of the cell number "1" shown in FIG. 6. The outline of the minimum cluster 61 is represented by thick solid lines in FIG. 6 (the same is applied in FIG. 8). Similarly in the halftone cells 712 of the cell numbers "2" to "16" (see FIG. 5), the minimum cluster 61 having the same form as the minimum cluster 61 of the halftone cell 712 having the cell number "1" is defined at a location including the cell center 7120. Thus, a plurality of minimum clusters 61 which is the same number as the halftone cells 712 arranged in the matrix space (16 clusters 61 in the preferred embodiment), are defined uniformly spaced apart from one another in the matrix space (Step S12).

As shown in FIG. 6, the minimum cluster 61 has a rectangular (square in the preferred embodiment) main cluster 62 consisting of 9 pixels and four sub-clusters 63 located around the main cluster 62 radially, each of which is one pixel.

The minimum cluster 61 is located so that its barycentric position coincides with the cell center 7120 or its barycentric position gets closer to the cell center 7120. In the preferred embodiment, an upper right vertex of the central pixel out of the 9 pixels of the main cluster 62, which are arranged in a square form, coincides with the cell center 7120 (i.e., the upper right vertex is located at the same position with the cell center 7120).

One vertex of each sub-cluster 63 coincides with a vertex of the main cluster 62, and the other vertices and all sides of the sub-cluster 63 do not coincide with the main cluster 62. In other words, each sub-cluster 63 contacts with only a vertex of the main cluster 62. Each sub-cluster 63 is smaller than the main cluster 62 in the horizontal direction in FIG. 6 which is the first direction parallel to a pair of sides of the main cluster 62 and is also smaller than the main cluster 62 in the vertical direction in FIG. 6 which is the second direction perpendicular to the first direction.

After definition of the minimum clusters 61, the same threshold value "0" is assigned to all the pixels (i.e., 13 pixels) included in the minimum cluster 61 which is defined in the halftone cell 712 of the cell number "1" (Step S13), and the presence or absence of a halftone cell 712 having the next cell number is confirmed (Step S14). In this case, it is judged that the next halftone cell 712 exists and the operation goes back to Step S13. The threshold value "13" which is larger than the threshold value "0" by 13 that is the number of pixels included in the minimum cluster 61, is assigned to all the pixels in the minimum cluster 61 defined in the halftone cell 712 of the cell number "2", and thereafter, the presence or absence of the next halftone cell 712 is confirmed again (Steps S13, S14).

With respect to the minimum clusters 61 which are respectively defined in the halftone cells 712 of the cell numbers "3" to "16", the same processes as those performed on the minimum cluster 61 defined in the halftone cell 712 of the cell number "2" is performed. That is to say, the step of assigning a threshold value which is larger than a threshold value assigned to a minimum cluster 61 by 13 that is the number of pixels included in the minimum cluster 61, to all the pixels included in the next minimum cluster 61, is repeated to the minimum clusters 61 which are respectively defined in the halftone cells 712 of the cell numbers "2" to "16" (Steps S13, S14). With this operation, the same threshold value "26" is assigned to 13 pixels in the minimum cluster 61 defined in the halftone cell 712 of the cell number "3", and the threshold values "39", "52", "65", "78", "91", "104", "117", "130", "1143", "156", "169", "182", and "195" are similarly assigned to the minimum clusters 61 in the halftone cells 712 of the cell numbers "4" to "13", respectively.

Figure 7:
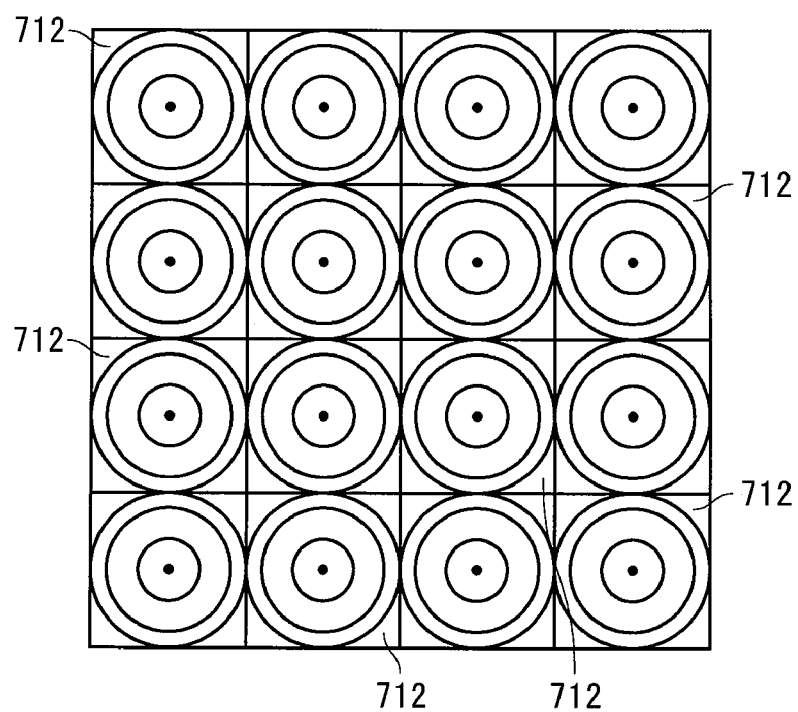
FIG. 7 is a view showing a distribution of evaluation values in a matrix space.

After assignment of threshold values to all the minimum clusters 61 is finished, an evaluation value is obtained for each of pixels included in an area excluding the 16 minimum clusters 61 in the matrix space as to become larger as the distance between a cell center 7120 of a halftone cell 7120 in which the each pixel is included and the each pixel becomes longer. FIG. 7 is a view showing a distribution of evaluation values in each of the halftone cells 712 included in the matrix space by contour lines. A pixel whose evaluation value is minimum (i.e., a pixel which is closest to the cell center 7120) is selected, and the threshold value "208" which is larger than the threshold value "195" set in the minimum cluster 61 of the halftone cell 712 having the cell number "16", by 13 that is the number of pixels included in the minimum cluster 61, is assigned to a selected pixel.

In generation of the threshold matrix 710, threshold values of integer numbers which increase from "208" to "4095" by 1 are sequentially assigned to a plurality of pixels (3888 pixels in the preferred embodiment) included in the area excluding the 16 minimum clusters 61 in the matrix space, from one having the smallest evaluation value (Step S15). In other words, the threshold values which increase by 1 are sequentially assigned to the pixels, from one which is closest to the minimum cluster 61, and these threshold values are the order of pixels where writing should be performed in accordance with increase of gray level of the original image, and the order corresponds to, i.e., a turn-on order (lighting order) of the pixels during exposure. That is to say, in Step S15, threshold values are set to the area excluding the 16 minimum clusters 61 in the matrix space so that halftone dot areas grow from a plurality of minimum halftone dots in a halftone image corresponding to the plurality of minimum clusters 61, in accordance with increase of gray level of the original image.

Figure 8:
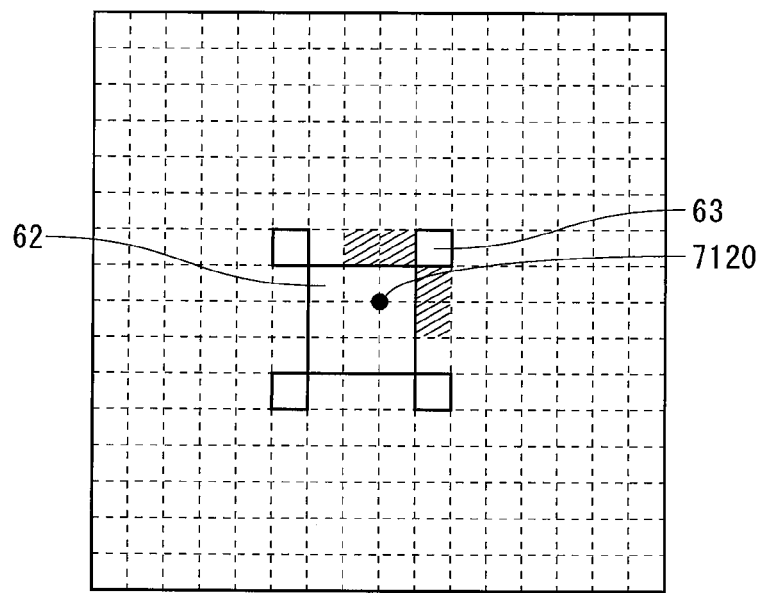
FIG. 8 is a view showing the one halftone cell.

In each of the 16 halftone cells 712, as indicated by diagonal lines in FIG. 8, left two pixels of a sub-cluster 63 which is located at the upper right of the main cluster 62 and lower two pixels of the sub-cluster 63 are first selected (i.e., 64 pixels in the matrix space become selected pixels) in Step S15 in the present preferred embodiment. Then, out of four selected pixels included in the halftone cell 712 of the cell number "1", the threshold value "208" is assigned to a selected pixel which is located at the leftmost and the uppermost position relative to the cell center 7120. In the halftone cells 712 of the cell numbers "2" to "16", the threshold values "209" to "223" are sequentially assigned to the selected pixels corresponding to the selected pixel to which the threshold value "208" is assigned, from one having the smallest cell number.

Subsequently, in the halftone cells 712 of the cell numbers "1" to "16", the threshold values "224" to "239" are sequentially assigned to the next selected pixels of respective selected pixels to which the threshold values are assigned, from one having the smallest cell number (the next selected pixels are, for example, selected pixels located at the farthest locations from the selected pixels to which the threshold values have been assigned). Similarly, in the respective halftone cells 712 of the cell numbers "1" to "16", the threshold values "240" to "255" are assigned to the third selected pixels, from one having the smallest cell number, and the threshold values "256" to "271" are sequentially assigned to the fourth selected pixels, from one having the smallest cell number.

Next, in each of the halftone cells 712, pixels whose evaluation values are next smaller than those of the above pixels to which the threshold values "208" to "271" are assigned are made to selected pixels, and threshold values which increase from "272" by 1 are sequentially assigned to the selected pixels of the halftone cells 712, from one having the smallest cell number of the halftone cell 712. In a case where a plurality of selected pixels are included in a halftone cell 712, similarly to the above case, the threshold values "272" to "287" are sequentially assigned to the first selected pixels of the respective halftone cells 712 in the order of cell numbers, in accordance with a predetermined order defined to the plurality of selected pixels, the threshold values "288" to "303" are sequentially assigned to the next selected pixels of the respective halftone cells 712 in the order of cell numbers, and the same procedure is repeated until a threshold value is assigned to all of the plurality of selected pixels. Similarly, threshold values are sequentially assigned to all the pixels in the area excluding the 16 minimum clusters 61 in the matrix space.

The number of gray levels in screening is equal to the number of pixels included in the matrix space (i.e., the number of gray levels in screening is the number of gray levels in meshing, and is made equal to the number of gray levels of the original image in the preferred embodiment) (Step S16), generation of the threshold matrix 710 is completed by assigning a threshold value to each pixel in the matrix space in the above Steps S13 to S15.

In a case where the number of gray levels in screening is different from the number of pixels included in the matrix space (Step S16), reduction of gray levels is performed on the threshold value assigned to each pixel in accordance with the number of gray levels in screening and the final threshold value is thereby assigned to each pixel to generate the threshold matrix 710 (Step S17). For example, when the number of pixels in the matrix space is M and the number of gray levels in screening is N, the threshold values "0" to "(M−1)" assigned to each pixel are multiplied by "((N−1)/(M−1))" and the final threshold values "0" to "(N−1)" are assigned to each pixel. In this preferred embodiment, since the number of gray levels of the original image 70 is 4096 (=12 bit) and the number of pixels in the matrix space is equal to that in the original image 70, Step S17 is not performed.

After the threshold matrix 710 is generated by the computer 11 shown in FIG. 1, the threshold matrix 710 and the data of the original image stored in the image memory 104 are transmitted to the image recording apparatus 12 through the communication part 109 as discussed earlier, and the threshold matrix 710 and the data of the original image are stored in the SPM 23 and the image memory 21 shown in FIG. 2, respectively. With this operation, a group of threshold values is set to the SPM 23 having the matrix space with an array of the plurality of (16 in the preferred embodiment) halftone cells 712 (see FIG. 5), the matrix space corresponding to the repeat area 71 (see FIG. 3) (Step S18). There may be a case where the threshold matrix 710 generated by the computer 11 is, for example, stored in a recording medium such as a compact disk, a flash memory, or a hard disk and stored in the image recording apparatus 12 through the recording medium.

A pixel value of each pixel (a gray level of each pixel) in the repeat area 71 is compared with a threshold value in the matrix space corresponding to the pixel value, in the comparator 25, to determine a pixel value at the position (address) of the above pixel in a binary halftone image. Specifically, in (a part of) the original image 70 shown in FIG. 3, for example, a pixel value "1" is assigned (i.e., a dot is set) at each position where a pixel value is larger than the threshold values corresponding to the pixel value, and a pixel value "0" is assigned (i.e., a dot is not set) at each of remaining pixels. In this way, in the image recording apparatus 12, halftoning is performed on the original image 70 with using the threshold matrix 710 by the signal generation circuit 123 to generate halftone image data which represents ON/OFF of light beams in recording halftone dots discussed later (Step S19).

In generation of the halftone image, for example, in a case where the gray level of all the pixels included in the repeat area 71 is "0", since the gray level of each pixel is not larger than the threshold values set in the threshold matrix 710, halftone dots are not formed in the repeat area 71. In other words, in a case where the gray level of all the pixels in the repeat area 71 is "0", the gray level of all the pixels is the lowest gray level where any halftone dots do not exist in the repeat area 71.

FIGS. 9A to 9D are views each showing a halftone area included in a halftone image generation space (i.e., a part of a halftone image) corresponding to one repeat area 71 of the original image 70. In FIGS. 9A to 9D, the outline of the halftone area included in the halftone image corresponding to each halftone cell 712 is represented by a broken line, and the outline of a halftone dot is represented by a thick solid line.

Figure 9A:
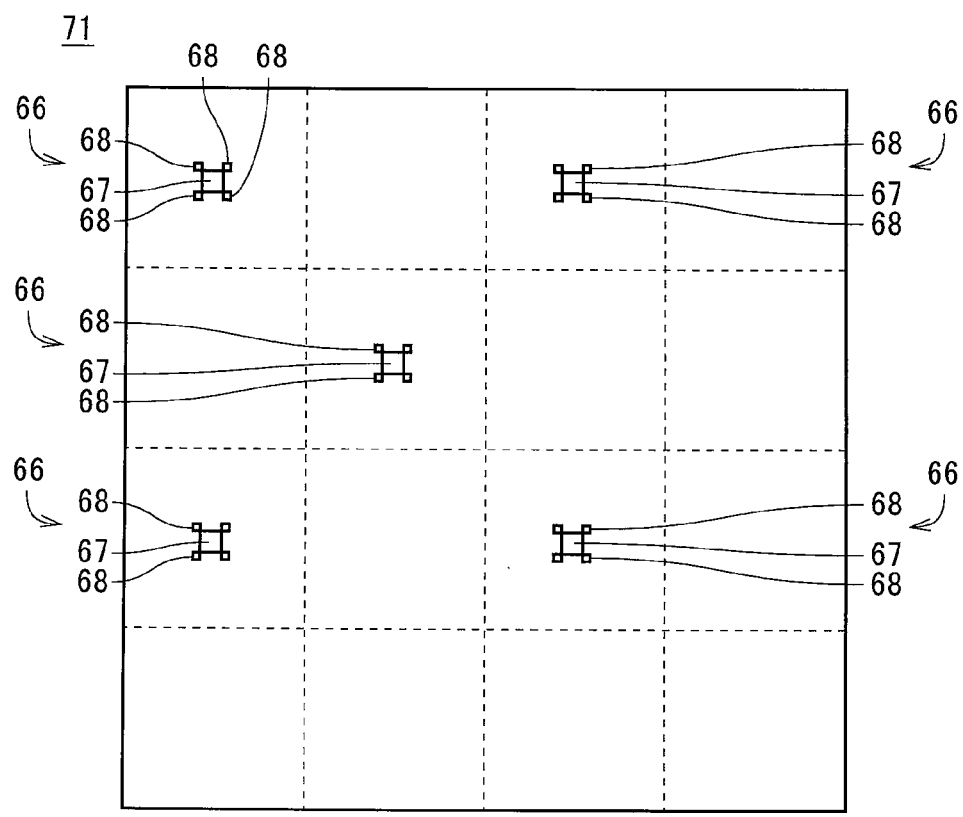
FIGS. 9A to 9D are views each showing a part of a halftone image.

FIG. 9A is a view showing a part of a halftone image in a case where the gray level of each pixel in the repeat area 71 is between "53" to "65". As discussed above, in the threshold matrix 710, since the threshold values "0", "13", "26", "39", and "52" are assigned to the minimum clusters 61 (see FIG. 6) defined in the halftone cells 712 of the cell numbers "1" to "5" and the threshold values "65" or more are assigned to the minimum clusters 61 included in the halftone cells 712 of the cell numbers "6" or more, minimum halftone dots 66 corresponding to the minimum clusters 61 are formed at five halftone dot-central positions (i.e., dot centers) corresponding to the cell centers 7120 (see FIG. 6) of the halftone cells 712 having the cell numbers "1" to "5", and halftone dots are not formed in halftone areas corresponding to the halftone cells 712 other than the halftone cells 712 having the cell numbers "1" to "5" in the halftone image shown in FIG. 9A.

Similarly to the minimum cluster 61, the minimum halftone dot 66 has a rectangular (square in this preferred embodiment) main cluster 67 consisting of 9 pixels and four sub-clusters 68 located around the main cluster 67 radially, each of which is one pixel.

One vertex of each sub-cluster 68 coincides with a vertex of the main cluster 67, and the other vertices and all sides of the sub-cluster 68 do not coincide with the main cluster 67. In other words, each sub-cluster 68 contacts with only a vertex of the main cluster 67. Each sub-cluster 68 is smaller than the main cluster 67 in the horizontal direction in FIG. 9A which is the first direction parallel to a pair of sides of the main cluster 67 and is also smaller than the main cluster 67 in the vertical direction in FIG. 9A which is the second direction perpendicular to the first direction.

Figure 9B:
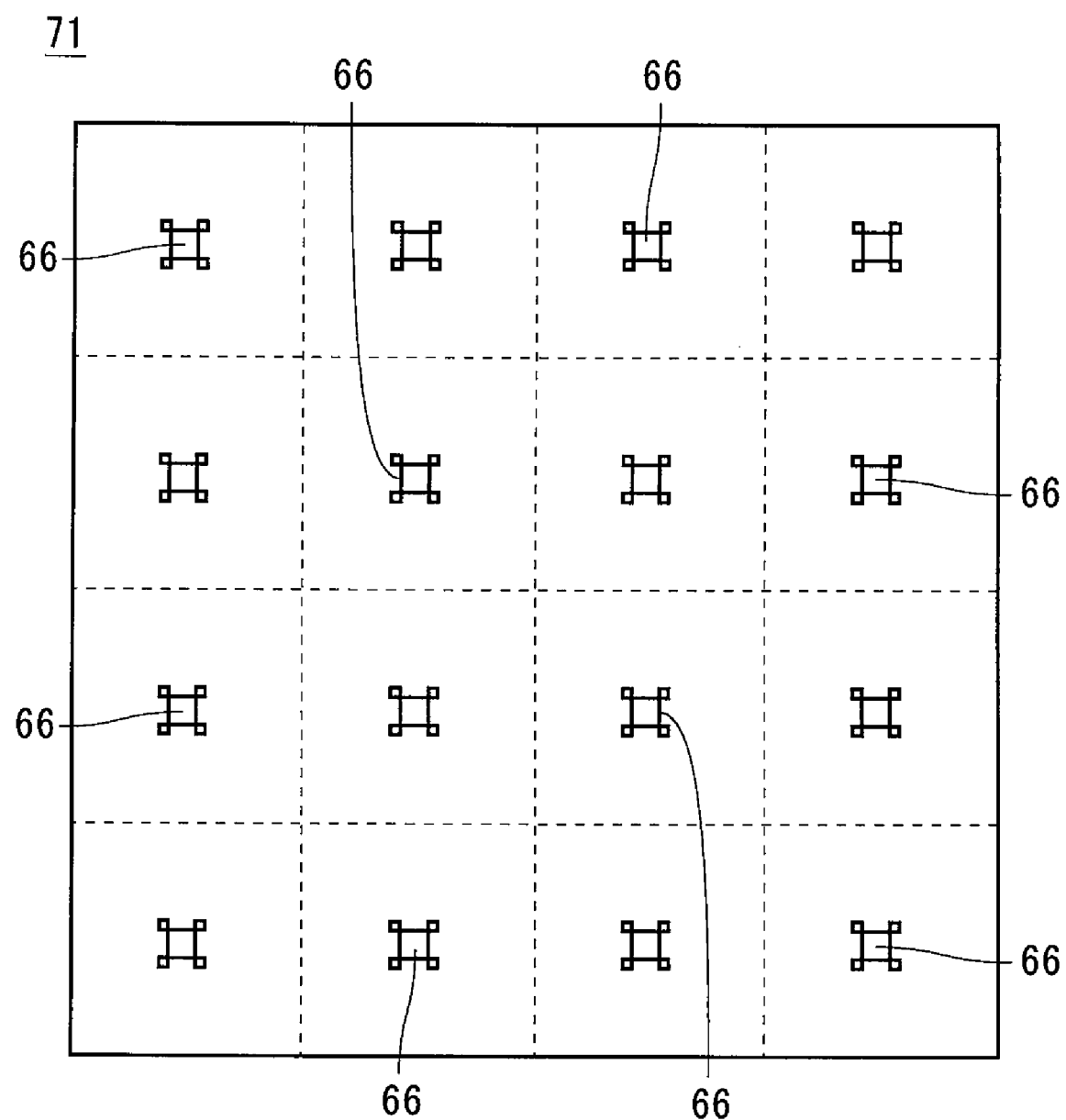

FIG. 9B is a view showing a part of a halftone image in a case where the gray level of each pixel in the repeat area 71 is between "196" to "208". As discussed above, in the threshold matrix 710, since the threshold values "195" or more are assigned to the minimum clusters 61 defined in each halftone cell 712 and the threshold values "208" or more are assigned to pixels located around the minimum clusters 61, the minimum halftone dots 66 are formed at 16 halftone dot-central positions corresponding to the cell centers 7120 of all the halftone cells 712, and pixel values of the pixels other than the minimum halftone dots 66 are all "0" in the halftone image shown in FIG. 9B.

Figure 9C:
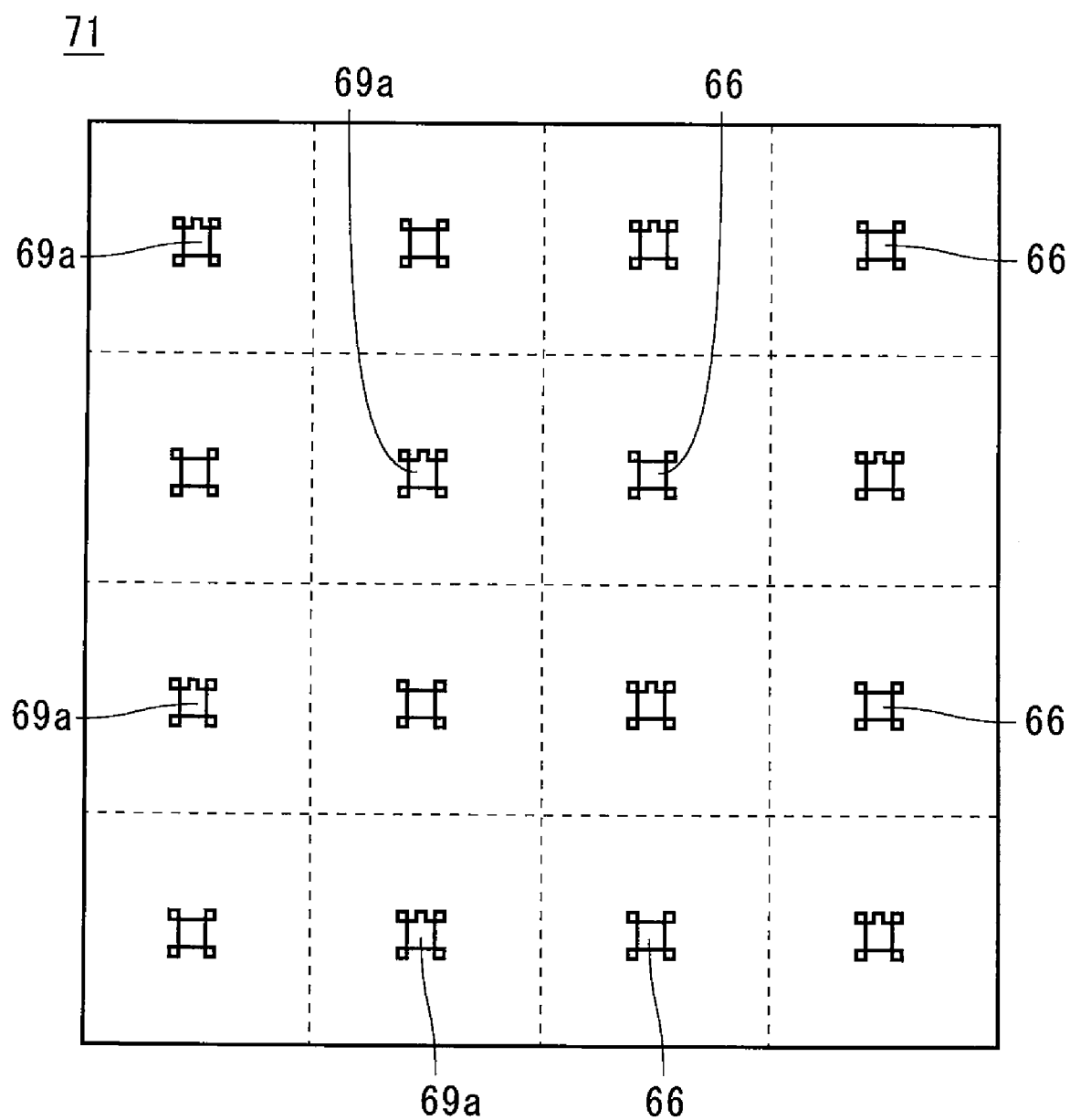

FIG. 9C is a view showing a part of a halftone image in a case where the gray level of each pixel in the repeat area 71 is uniformly "216". As discussed above, in the threshold matrix 710, since the threshold values "208" to "223" are assigned to pixels which are respectively adjacent to the minimum clusters 61 of the halftone cells 712 having the cell numbers "1" to "16", halftone dots 69a which grow from the minimum halftone dots by one pixel are formed at 8 halftone dot-central positions corresponding to the cell centers 7120 of the halftone cells 712 having the cell numbers "1" to "8", and the minimum halftone dots 66 are formed at 8 halftone dot-central positions corresponding to the cell centers 7120 of the halftone cells 712 having the cell numbers "9" to "16" in the halftone image shown in FIG. 9C.

Figure 9D:
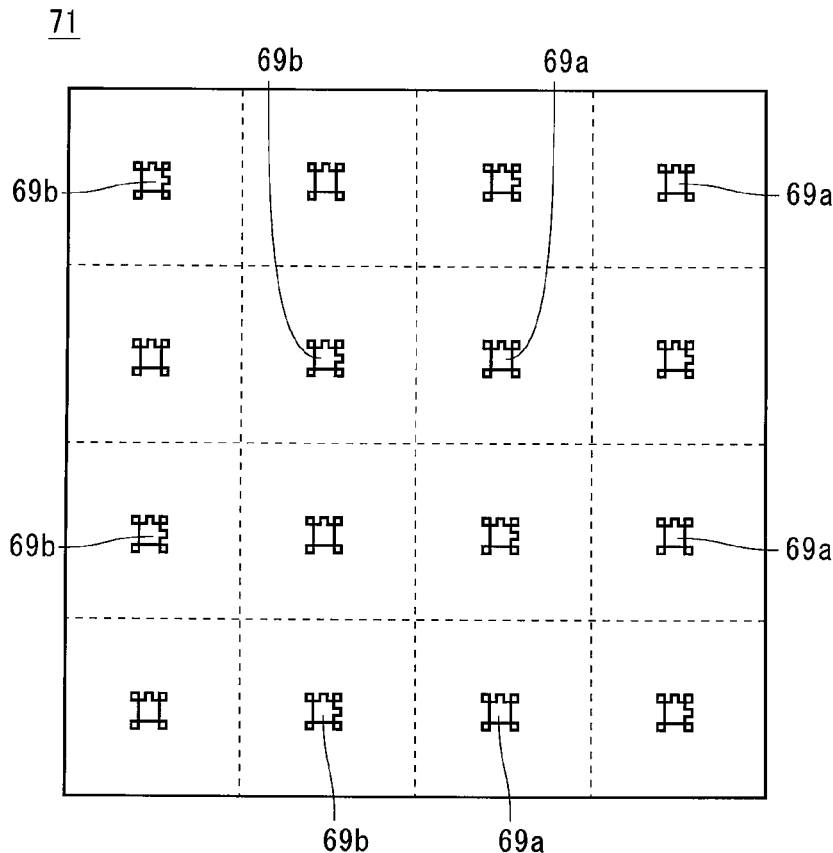

FIG. 9D is a view showing a part of a halftone image in a case where the gray level of each pixel in the repeat area 71 is uniformly "232". As discussed above, in the threshold matrix 710, since the threshold values "208" to "223" are assigned to the pixels which are respectively adjacent to the minimum clusters 61 of the halftone cells 712 having the cell numbers "1" to "16" and the threshold values "224" to "239" are assigned to another pixels which are respectively adjacent to the minimum clusters 61 of the halftone cells 712 having the cell numbers "1" to "16", halftone dots 69b which grow from the minimum halftone dots by two pixels are formed at 8 halftone dot-central positions corresponding to the cell centers 7120 of the halftone cells 712 having the cell numbers "1" to "8", and halftone dots 69a which grow from the minimum halftone dots by one pixel are formed at 8 halftone dot-central positions corresponding to the cell centers 7120 of the halftone cells 712 having the cell numbers "9" to "16" in the halftone image shown in FIG. 9D.

In generation of the halftone image, when the gray level of each pixel in the repeat area 71 is equal to or smaller than "208" as described earlier, the minimum halftone dots 66 are formed at a plurality of halftone dot-central positions (i.e., predetermined halftone dot-central positions) corresponding to the cell centers 7120 of the plurality of halftone cells 712 in the threshold matrix 710 so that the density of minimum halftone dots 66 is increased as the gray level in the repeat area 71 becomes higher.

In a case where the gray level of each pixel in the repeat area 71 is higher than "208", halftone dots which grow from the minimum halftone dots 66 as the gray level of the repeat area 71 becomes higher are formed at halftone dot-central positions. Specifically, as the gray level of each pixel in the repeat area 71 increases from "209", the halftone dots 69a which grow from the minimum halftone dots 66 by one pixel are formed at halftone dot-central positions, from one having the smallest cell number of the halftone cell 712 corresponding to the each pixel. After the halftone dot 69a is formed at all the halftone dot-central positions, the halftone dots 69b which grow from the halftone dots 69a by one pixel are formed at halftone dot-central positions, from one having the smallest cell number of the halftone cell 712 corresponding to the each pixel. In other words, as the gray level in the repeat area 71 increases from "209", a plurality of halftone dots formed at a plurality of halftone dot-central positions grow circularly with the expansion of the contour lines shown in FIG. 7.

As discussed above, in formation of the halftone image, in a case where the gray level of the repeat area 71 which may take the values of "0" to "4095" is equal to or smaller than "208", the number of minimum halftone dots 66 is increased in accordance with increase of gray level of the repeat area 71. In a case where the gray level of the repeat area 71 is higher than "208", halftone dots grow in accordance with increase of gray level of the repeat area 71 without changing the number of the halftone dots.

That is to say, the gray level "208" is a predetermined mode switching gray level where the manner (or mode) for changing halftone dots in forming a halftone image is switched from increase of the number of halftone dots to growth of halftone dots, and the mode switching gray level is a gray level which is close to the lowest gray level "0" where any halftone dots do not exist. The mode switching gray level is represented as $100 \times C/((A/B) \times (A/B))$ % of G, with using the resolution of a generated halftone image A (2400 dpi), the screen ruling of halftone dots B (150) per unit length (1 inch) corresponding to the resolution A, the number of pixels C (13) of a minimum halftone dot 66, and the number of gray levels G (4096) from the lowest gray level "0" to the highest gray level "4095". The mode switching gray level is about 5% in the present preferred embodiment. Therefore, a dot area rate (i.e., a ratio of halftone dots per unit area) in the mode switching gray level is about 5%.

In the actual generation of a halftone image, a plurality of pixels in the gray scale original image 70 have various values from "0" to "4095". In a halftone area included in the halftone image generation space corresponding to a grayscale area included in the original image 70, the gray levels of the gray scale area being equal to or lower than the mode switching gray level (i.e., the halftone area included in the halftone image generation space corresponds to a part of the halftone image, and the gray levels of a grayscale area included in the original image 70 corresponding to the part of the halftone image is equal to or lower than the mode switching gray level), the minimum halftone dots 66 are formed at the plurality of halftone dot-central positions so that the density of minimum halftone dots 66 is increased as the gray level of the original image 70 becomes higher. In another halftone area included in the halftone image generation space corresponding to another grayscale area included in the original image 70, the gray levels of the another grayscale area being higher than the mode switching gray level (i.e., the another halftone area included in the halftone image generation space corresponds to a part of the halftone image, and the gray levels of another grayscale area included in the original image 70 corresponding to the part of the halftone image is higher than the mode switching gray level), halftone dots which grow from the minimum halftone dots 66 as the gray level of the original image 70 becomes higher are formed at halftone dot-central positions.

Figure 10:
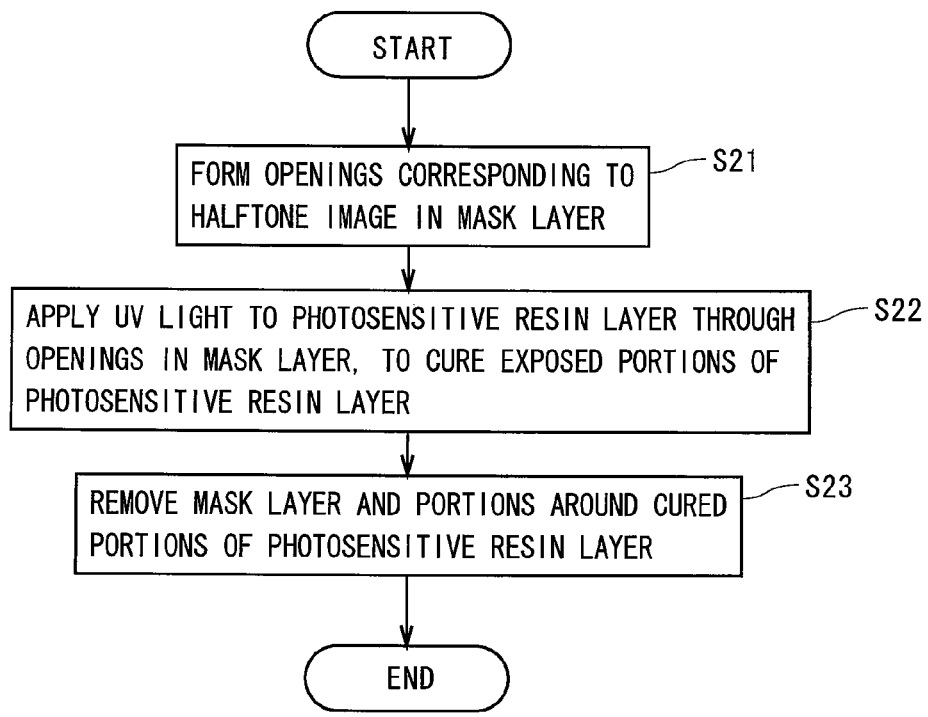
FIG. 10 is a flowchart showing a process flow for forming a halftone image on a printing plate.
Figure 11A:
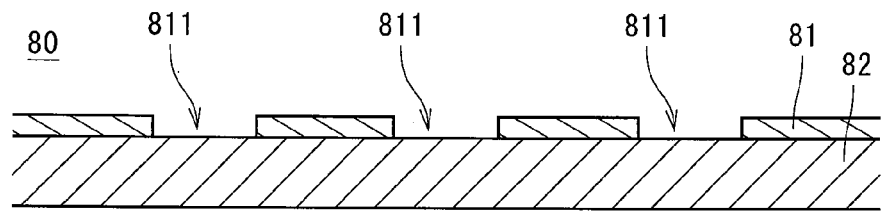
FIGS. 11A to 11C are cross-sectional views each showing a plate member in the process of forming a halftone image.
Figure 11B:
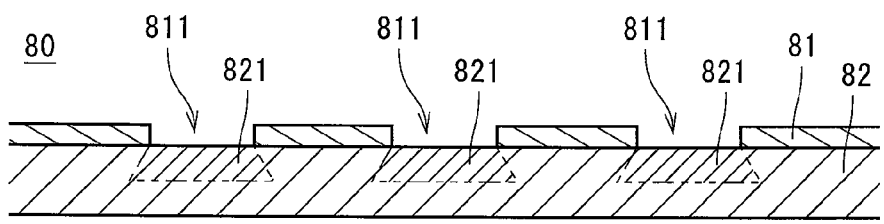
Figure 11C:
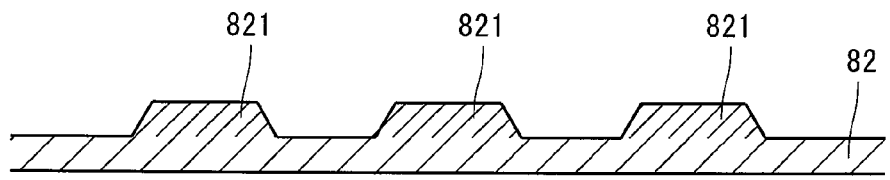

FIG. 10 is a flowchart showing an operation flow for forming a halftone image on a printing plate for letterpress printing. FIGS. 11A to 11C are cross-sectional views each showing a part of the plate member 80 in the process of forming a halftone image. In forming a halftone image on a printing plate, first, light beams are applied (irradiated) to the mask layer of the plate member 80 on the basis of the halftone image data generated in the above Steps S11 to S19 (see FIGS. 4A and 4B) in the image recording apparatus 12 shown in FIG. 1, and parts of the mask layer are removed by ablation to form openings 811 corresponding to the halftone image, in the mask layer 81 of the plate member 80, as shown in FIG. 1A (Step S21). In the preferred embodiment, since the photosensitive resin layer 82 of the plate member 80 is formed of photosensitive resin with UV curability, the openings 811 are formed at portions in the mask layer 81 corresponding to halftone dots in the halftone image.

Subsequently, the plate member 80 is loaded out from the image recording apparatus 12, and UV light is applied to the photosensitive resin layer 82 through the openings 811 formed in the mask layer 81, to cure exposed portions of the photosensitive resin layer 82, as shown by two-dot chain lines and narrower diagonal lines in FIG. 11B (Step S22).

Next, the plate member 80 is washed out with a brush while applying developing liquid to the plate member 80 (i.e., a development process is performed) to remove the mask layer 81 and portions around cured portions 821 of the photosensitive resin layer 82, which are portions excluding the cured portions 821 of the photosensitive resin layer 82 (Step S23). After the photosensitive resin layer 82 is dried, adhesive components contained in the photosensitive resin layer 82 are removed by another exposure, and the photosensitive resin layer 82 where the cured portions 821 are convex portions is formed as a printing plate having the convex portions corresponding to the halftone image as shown in FIG. 11C. In a highlight area of the printing plate where the dot area rate is small (the density of halftone dots is low), formed are convex portions (reliefs) corresponding to the minimum halftone dots 66 shown in FIGS. 9A and 9B (i.e., the square main cluster 67 consisting of 9 pixels shown in FIG. 9A and the four sub-clusters 68 located around the main cluster 67 radially, each of which is one pixel).

Figure 12A:
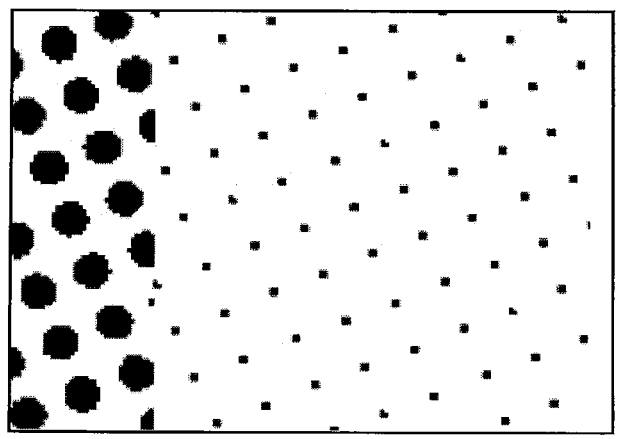
FIG. 12A is a view showing a halftone image in comparison for example.
Figure 12B:
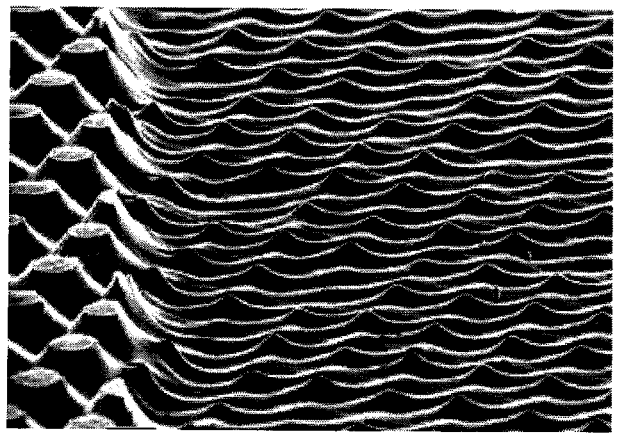
FIG. 12B is a view showing a surface of a printing plate which is formed on the basis of the halftone image in the comparison for example.

As shown in FIG. 12A, under the assumption of a halftone image for comparison of example where the minimum halftone dots formed in the right highlight area in FIG. 12A are a square consisting of four pixels, since the minimum halftone dots are too small in a printing plate for letterpress printing which is formed on the basis of such halftone image, the height of the convex portions corresponding to the minimum halftone dots is lacked to cause failure in the formation of reliefs, as shown in FIG. 12B. FIG. 12B is an image of a surface of the printing plate which is taken by an electron microscope (FIGS. 12D, 13B, 13D, and 13F are images taken by the same device).

Figure 12C:
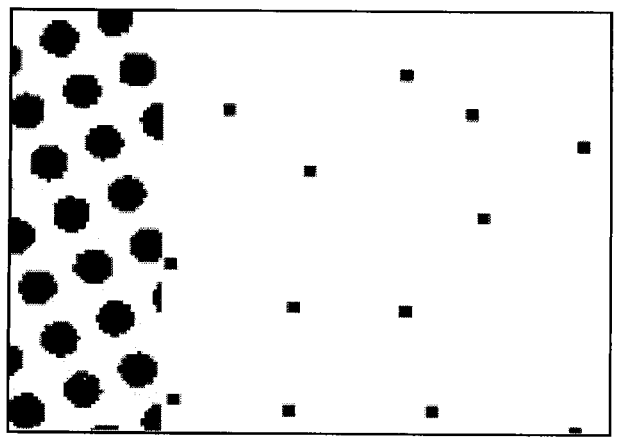
FIG. 12C is a view showing a halftone image in comparison for another example.
Figure 12D:
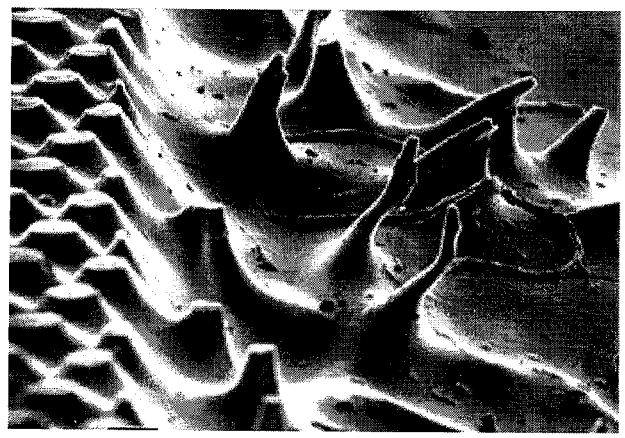
FIG. 12D is a view showing a surface of a printing plate which is formed on the basis of the halftone image in the comparison for another example.

As shown in FIG. 12C, under the assumption of a halftone image for comparison of another example where the minimum halftone dots formed in the right highlight area in FIG. 12C are a square consisting of 16 pixels, since the pitch of minimum halftone dots (i.e., the center-to-center distance between adjacent halftone dots) is large in a printing plate for letterpress printing which is formed on the basis of such halftone image, the convex portions corresponding to the minimum halftone dots are bended or the like to cause failure in the formation of reliefs, as shown in FIG. 12D.

Figure 13A:
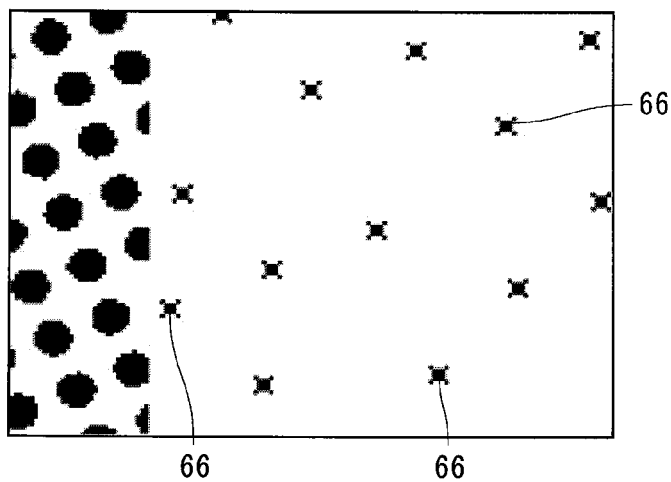
FIG. 13A is a view showing a halftone image.
Figure 13B:
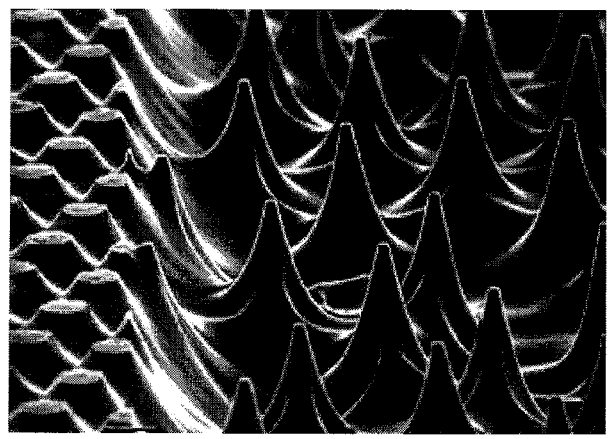
FIG. 13B is a view showing a surface of a printing plate.
Figure 13C:
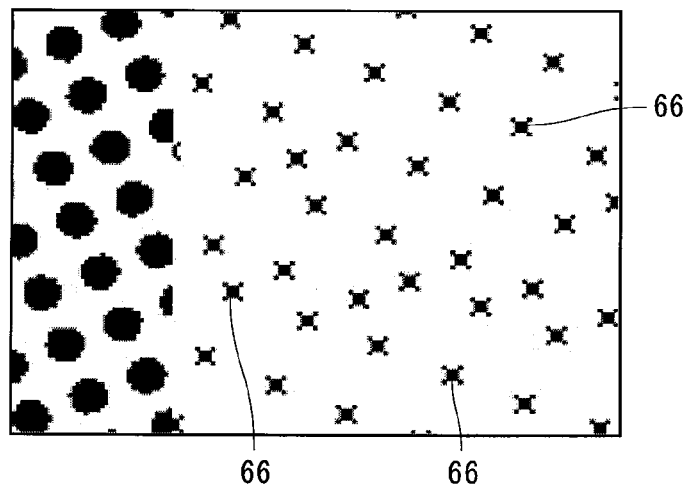
FIG. 13C is a view showing another halftone image.
Figure 13D:
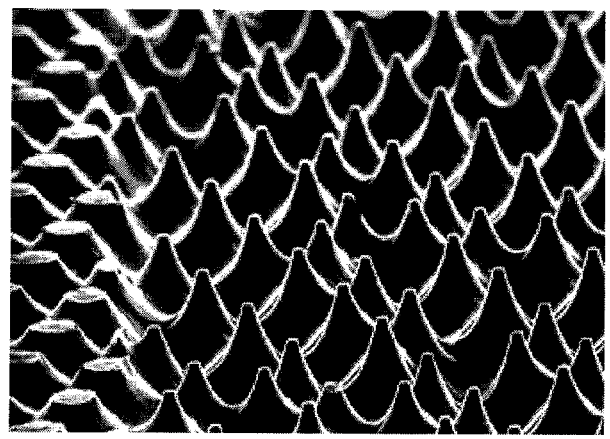
FIG. 13D is a view showing a surface of another printing plate.
Figure 13E:
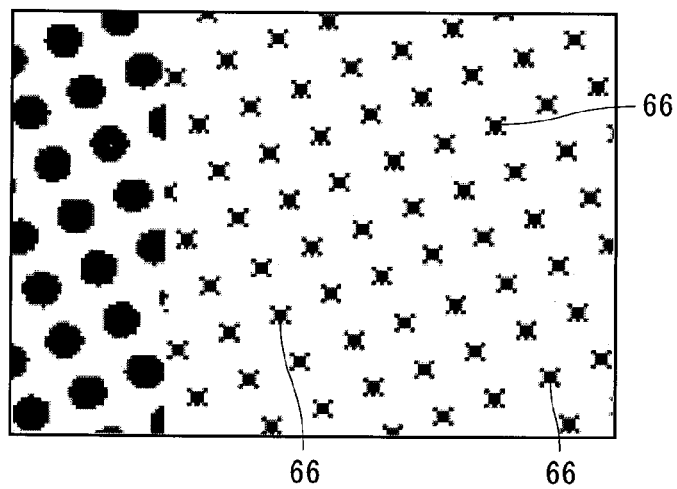
FIG. 13E is a view showing still another halftone image.
Figure 13F:
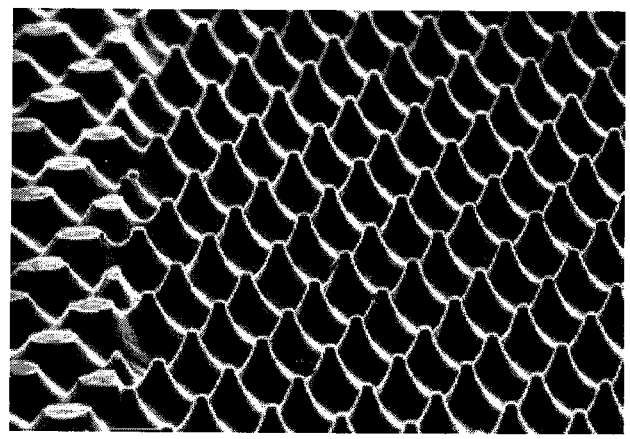
FIG. 13F is a view showing a surface of still another printing plate.

FIGS. 13A, 13C and 13E are views each showing a halftone image generated with the threshold matrix 710 in accordance with the preferred embodiment. FIGS. 13B, 13D and 13F are views each showing a surface of a printing plate for letterpress printing which is formed on the basis of the halftone image shown in FIG. 13A, 13C or 13E. The right areas in FIGS. 13A, 13C, and 13E are highlight areas in each of which only the minimum halftone dots 66 are formed, and the dot area rate in each of the highlight areas of FIGS. 13A, 13C and 13E is about 1%, 2%, and 5%.

In the minimum halftone dots 66 shown in FIGS. 13A, 13C and 13E, the sub-clusters 68 (see FIG. 9A) which contacts the square main cluster 67 (FIG. 9A) consisting of 9 pixels are located around the main cluster 67 in the halftone images according to the preferred embodiment. Therefore, in the convex portions corresponding to the minimum halftone dots 66 in the halftone image to be formed on the printing plate for letterpress printing, a convex portion corresponding to the main cluster 67 is supported by convex portions corresponding to the sub-clusters 68 formed around the main cluster 67, to increase the strength of relief corresponding to the minimum halftone dot 66. As shown in FIGS. 13B, 13D, and 13F, reliefs corresponding to the minimum clusters 66 are normally formed regardless of the dot area rate of the highlight area, to thereby improve reproduction in printing (especially, reproduction in detail in printing) of the halftone image formed on the printing plate for letterpress printing.

Especially, as shown in FIG. 9A, since the four sub-clusters 68 are provided in contact with the four vertices of the main cluster 67 (i.e., the four sub-clusters 68 are located around the main cluster 67 radially), the convex portion corresponding to the main cluster 67 is strongly supported by the convex portions corresponding to the sub-clusters 68 in the convex portions corresponding to the minimum halftone dots 66 in the halftone image to be formed on the printing plate, to increase the strength of reliefs corresponding to the minimum halftone dots 66. As a result, reproduction in printing of the halftone image formed on the printing plate for letterpress printing can be improved.

In the minimum halftone dots 66 included in the above halftone image, the sub-cluster 68 is smaller than the main cluster 67 in the first direction parallel to the pair of sides of the main cluster 67 and is smaller than the main cluster 67 in the second direction perpendicular to the first direction, to thereby prevent the sub-clusters 68 from excessively becoming large and prevent the number of pixels in the minimum halftone dot 66 from being excessively increased. Thus, (especially, when the dot area rate is small) in the highlight area of the halftone image, it is possible to prevent the pitch of minimum halftone dots 66 from excessively becoming large and prevent decrease of the strength of reliefs corresponding to the minimum halftone dots 66.

In the image recording system 1, the above-discussed threshold matrix 710 can be easily acquired by the processes of Steps S11 to S15 (or Steps S11 to S17), and the halftone image having the above minimum halftone dots 66 can be easily formed by using the threshold matrix 710. The printing plate having the halftone image where the strength of reliefs corresponding to the minimum halftone dots 66 is increased can be easily acquired by the processes of Steps S21 to S23, and reproduction in printing of the halftone image can be improved by using the printing plate.

In the above preferred embodiment, although the number of pixels of each of the minimum cluster 61, the main cluster 62 and the sub-cluster 63 in the threshold matrix 710 is 13, 9 and 1, the number of pixels of each cluster may be variously changed as long as the number of pixels of the minimum cluster is three or more, the number of pixels of the main cluster is two or more, and the number of pixels of the sub-cluster is smaller than that of the main cluster. Similarly in the halftone image, the number of pixels of each cluster may be variously changed as long as the number of pixels of the minimum halftone dot 66 is three or more, the number of pixels of the main cluster 67 is two or more, and the number of pixels of the sub-cluster 68 is smaller than that of the main cluster 67. For example, each sub-cluster of the minimum cluster 61 may be a plurality of pixels and in this case, the plurality of pixels are arranged approximately in a direction which extends from the main cluster, one pixel which is closest to the main cluster out of the plurality of pixels contacts with only the vertex of the main cluster or only a side of the one pixel contacts with a side of the main cluster, the side of the one pixel being shorter than that of the main cluster (the same is applied in the sub-cluster of the minimum halftone dot 66).

In the above preferred embodiment, though the four sub-clusters 63 are located around the main cluster 62, only one sub-cluster 63 may be provided in the minimum cluster 61 or two or more sub-clusters 63 may be provided around the main cluster 62 in the minimum cluster 61 so as not to be in contact with each other (the same is applied in the minimum halftone dot 66). Following discussion is made on another preferable example of the minimum cluster in the threshold matrix according to the present invention. The following descriptions of the minimum cluster are also applied in the minimum halftone dot in the halftone image.

Figure 14A:
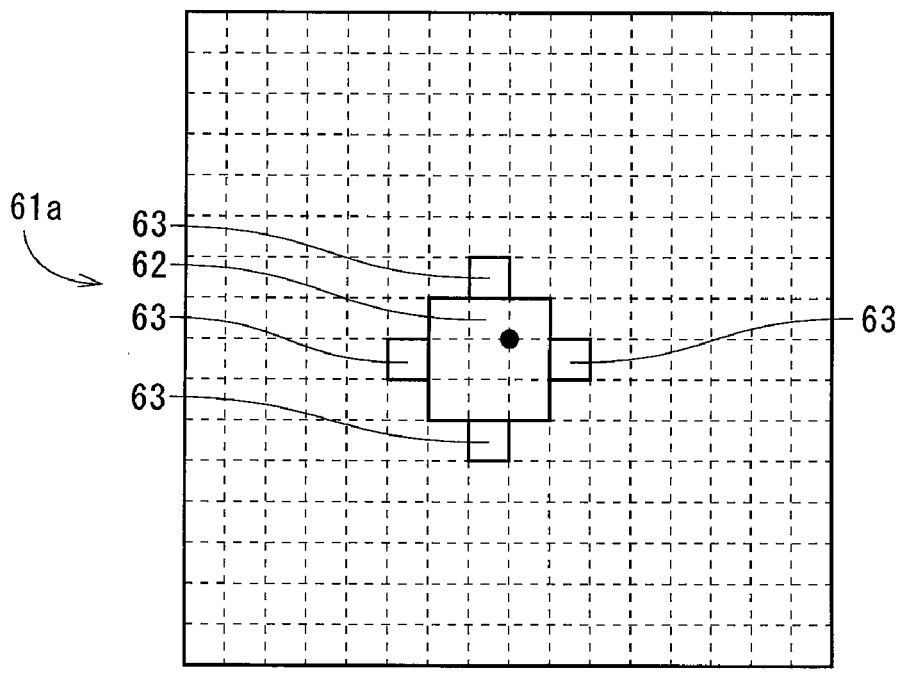
FIGS. 14A to 14C and FIGS. 15A to 15I are views each showing another example of a minimum cluster.

A minimum cluster 61a shown in FIG. 14A has a square main cluster 62 consisting of 9 pixels and four sub-clusters 63 located around the main cluster 62 radially, each of which is one pixel. A side of each sub-cluster 63 is shorter than that of the main cluster 62 and contacts with only the central portion of the side of the main cluster 62. In FIG. 14A, outlines of the main cluster 62 and the sub-clusters 63 are represented by thick solid lines (the same is applied in FIGS. 14B, 14C and FIGS. 15A to 15I). Also in a case where a halftone image is formed on a printing plate for letterpress printing with using a threshold matrix where the minimum clusters 61a are defined in a matrix space, the convex portion corresponding to the main cluster is supported by the convex portions corresponding to the sub-clusters in the convex portions corresponding to the minimum halftone dots in the printing plate, to increase the strength of reliefs corresponding to the minimum halftone dots, similarly to the above formation of the printing plate.

Figure 14B:
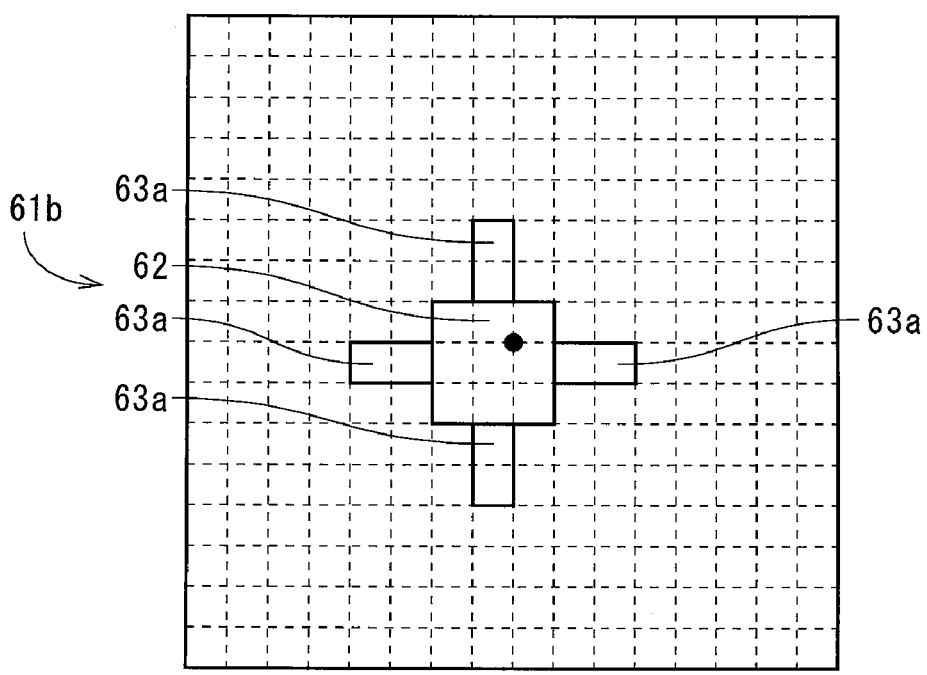

A minimum cluster 61b shown in FIG. 14B has the same main cluster 62 as that of FIG. 14A and four sub-clusters 63a located around the main cluster 62 radially. Each sub-cluster 63a consists of two pixels, and one side of a pixel closest to the main cluster 62 contacts with a side of the main cluster 62, the side of the main cluster 62 being longer than the one side of the pixel. The two pixels of each sub-cluster 63a are arranged in line in a direction which extends from the main cluster 62, along a direction perpendicular to a side of the main cluster 62 contacting the sub cluster 63a. Also in a case where a halftone image is formed on a printing plate for letterpress printing with using a threshold matrix where the minimum clusters 61b are defined in a matrix space, the strength of reliefs corresponding to the minimum halftone dots is increased similarly to the above formation of the printing plate. Since the sub cluster 63a is a plurality of pixels arranged in line, the convex portion corresponding to the main cluster is quite strongly supported by the convex portions corresponding to the sub-clusters in the convex portions corresponding to the minimum halftone dots in the printing plate, to still increase the strength of reliefs corresponding to the minimum halftone dots.

Figure 14C:
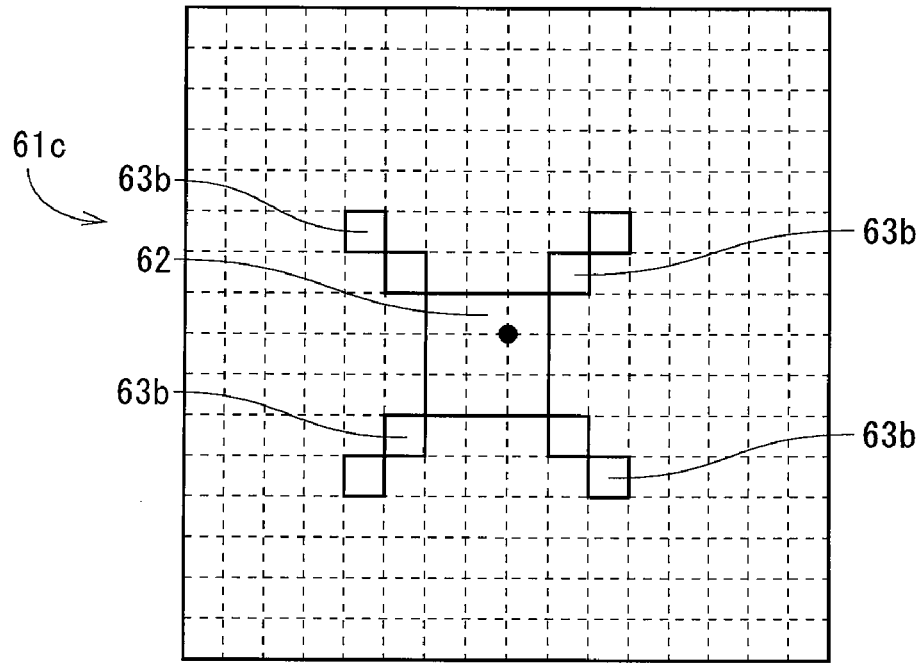

A minimum cluster 61c shown in FIG. 14C has the same main cluster 62 as that of FIG. 14A and four sub-clusters 63b located around the main cluster 62 radially. Each sub-cluster 63b is two pixels arranged in line in a direction which extends from the main cluster 62, along the diagonal line of the main cluster 62, and one vertex of a pixel closest to the main cluster 62 contacts with a vertex of the main cluster 62. A vertex of one pixel of the sub cluster 63b contacts with a vertex of the other pixel. Also in a case where a halftone image is formed on a printing plate for letterpress printing with using a threshold matrix where the minimum clusters 61c are defined in a matrix space, the strength of reliefs corresponding to the minimum halftone dots is increased similarly to the above formation of the printing plate. The strength of reliefs corresponding to the minimum halftone dots is still increased by the sub-clusters 63b each of which consists of a plurality of pixels arranged in line, similarly to the formation of the printing plate using the minimum clusters 61b.

FIGS. 15A to 15I are views each showing still another example of the minimum cluster in the threshold matrix according to the present invention, and the following descriptions of the minimum cluster is also applied in the minimum halftone dot in the halftone image. In a minimum cluster 61d shown in FIG. 15A, 8 sub-clusters 63 each of which is one pixel are located around the main cluster 62 radially. In a minimum cluster 61e shown in FIG. 15B, the four sub-clusters 63b which are the same as those of FIG. 14C contact with the vertices of the main cluster 62, and four sub-clusters 63c each of which consists of three pixels contact with the sides of the main cluster 62.

Figure 15A:
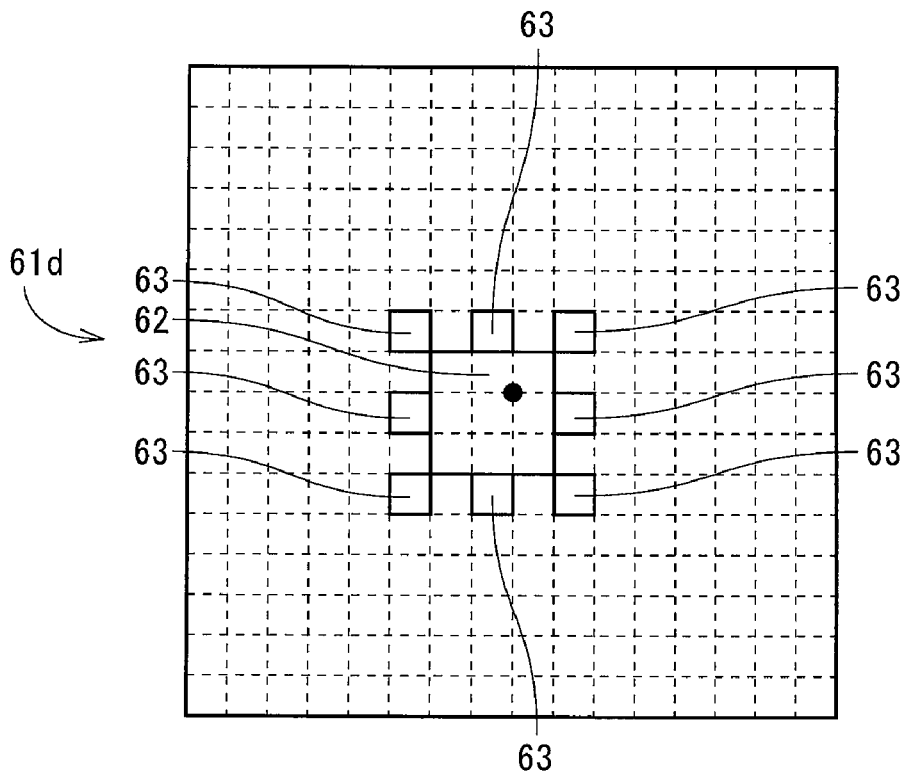
Figure 15B:
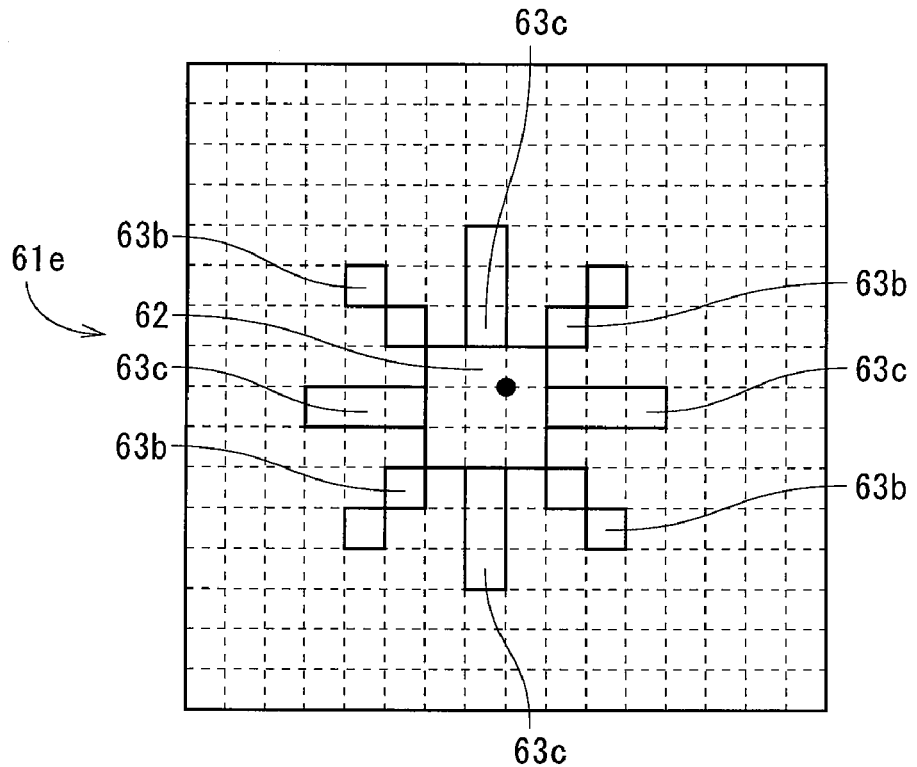
Figure 15C:
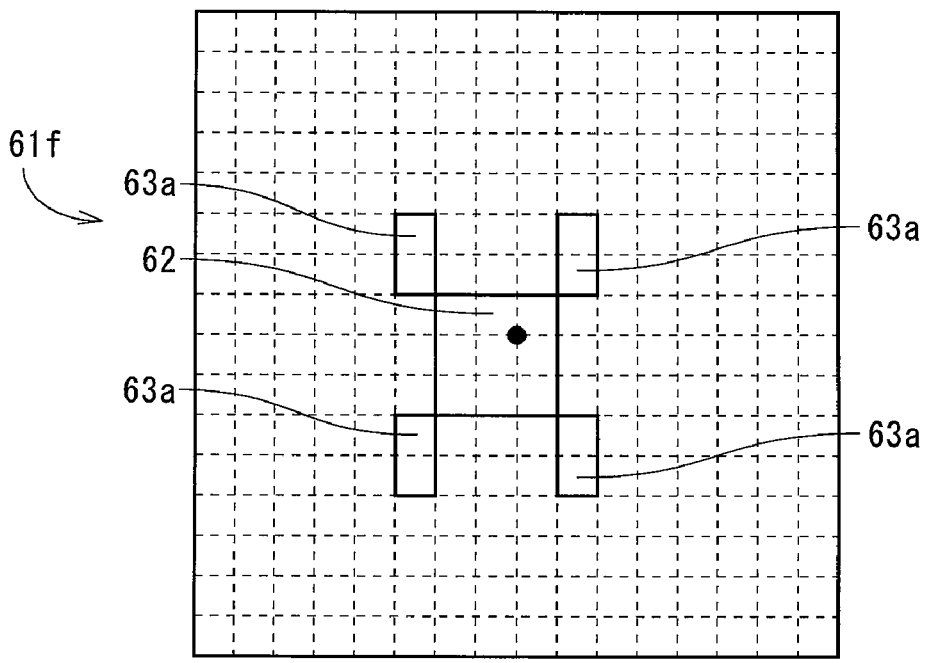
Figure 15D:
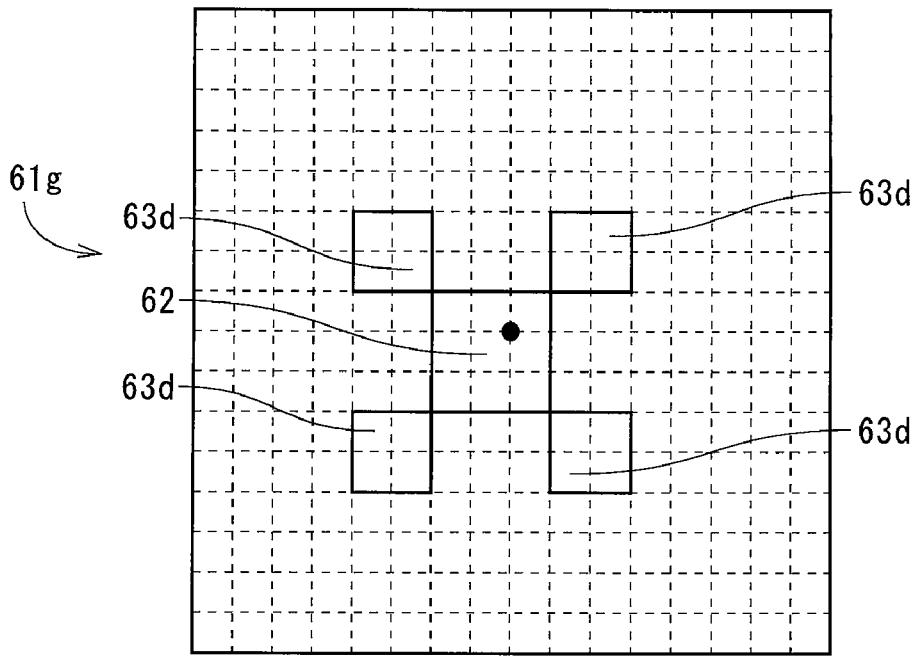

In a minimum cluster 61f shown in FIG. 15C, four sub-clusters 63a extending along a direction which is perpendicular to one side of the main cluster 62 contact with the vertices of the main cluster 62. In a minimum cluster 61g shown in FIG. 15D, square four sub-clusters 63d each of which consists of four pixels contact with the vertices of the main cluster 62.

Figure 15E:
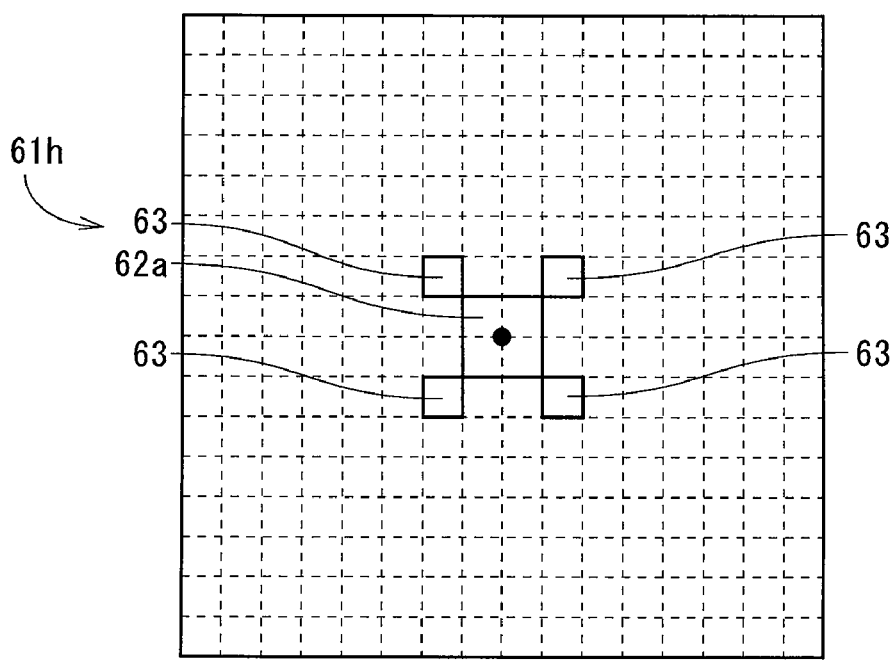
Figure 15F:
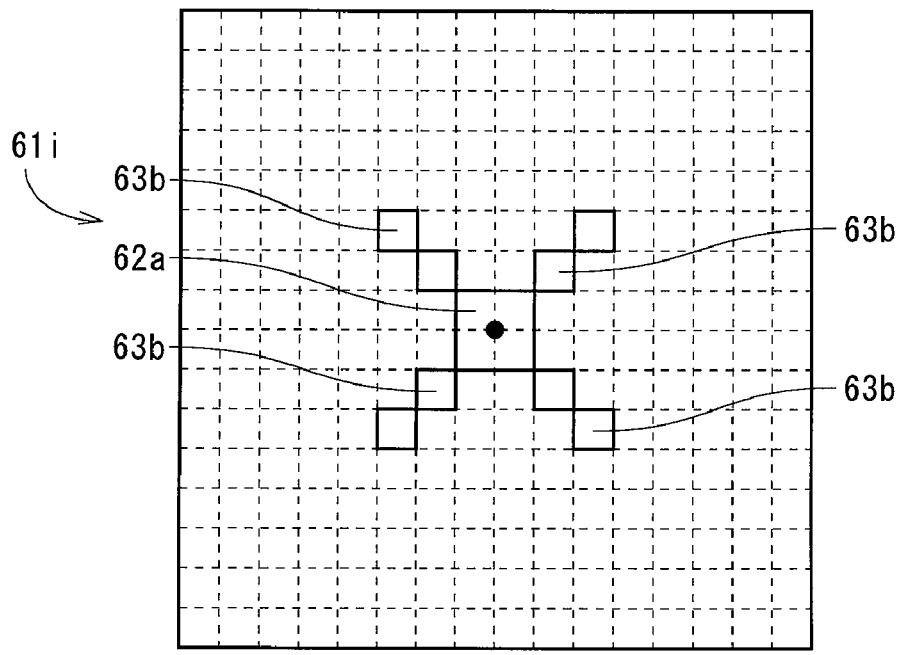

A minimum cluster 61h shown in FIG. 15E has a square main cluster 62a consisting of four pixels and the four sub-clusters 63 which are the same as those of FIG. 6. A minimum cluster 61i shown in FIG. 15F has the same main cluster 62a as that of FIG. 15E and the four sub-clusters 63b which are the same as those of FIG. 14C. In the minimum cluster 61i, the size of the main cluster 62a is equal to that of each sub-cluster 63b in the first direction parallel to a pair of sides of the main cluster 62a and the second direction perpendicular to the first direction.

Figure 15G:
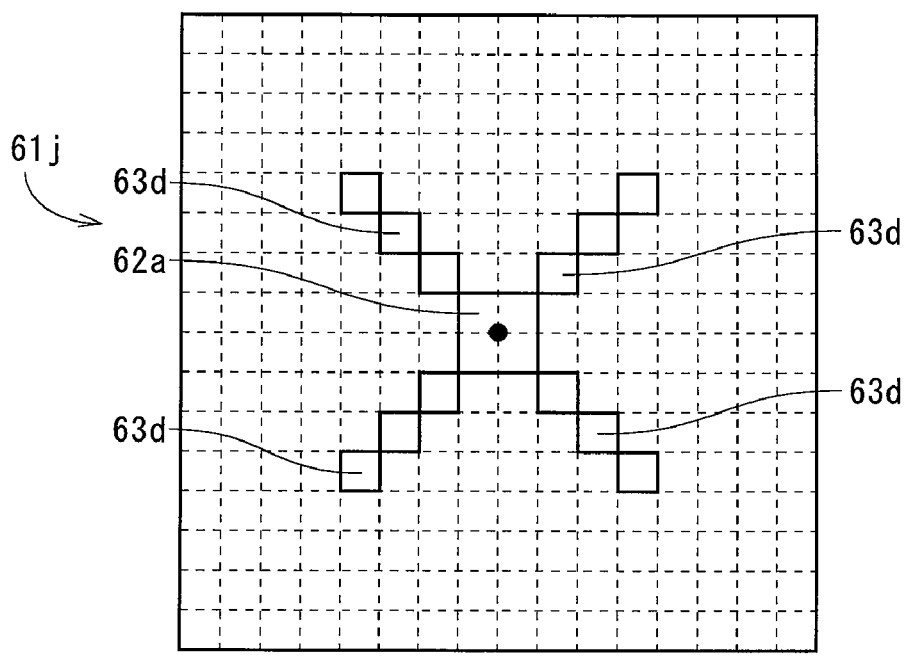

A minimum cluster 61j shown in FIG. 15G has the same main cluster 62a as that of FIG. 15E and four sub-clusters 63d each of which consists of three pixels. Each sub-cluster 63d is arranged in line along the diagonal line of the main cluster 62a, and only one vertex of a pixel closest to the main cluster 62a contacts with the main cluster 62a. In the minimum cluster 61j, each sub-cluster 63d is larger than the main cluster 62a in the above first and second directions.

Figure 15H:
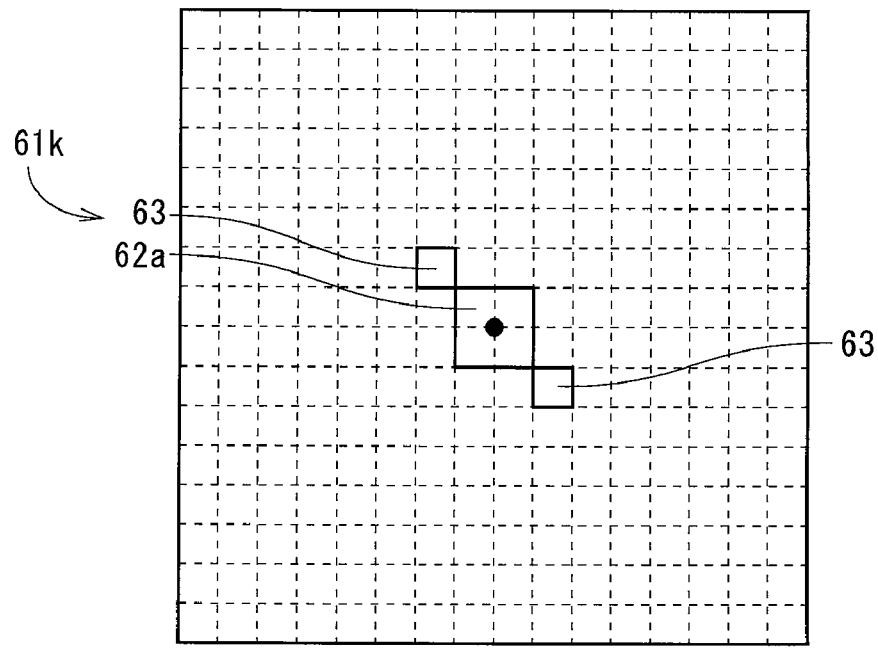
Figure 15I:
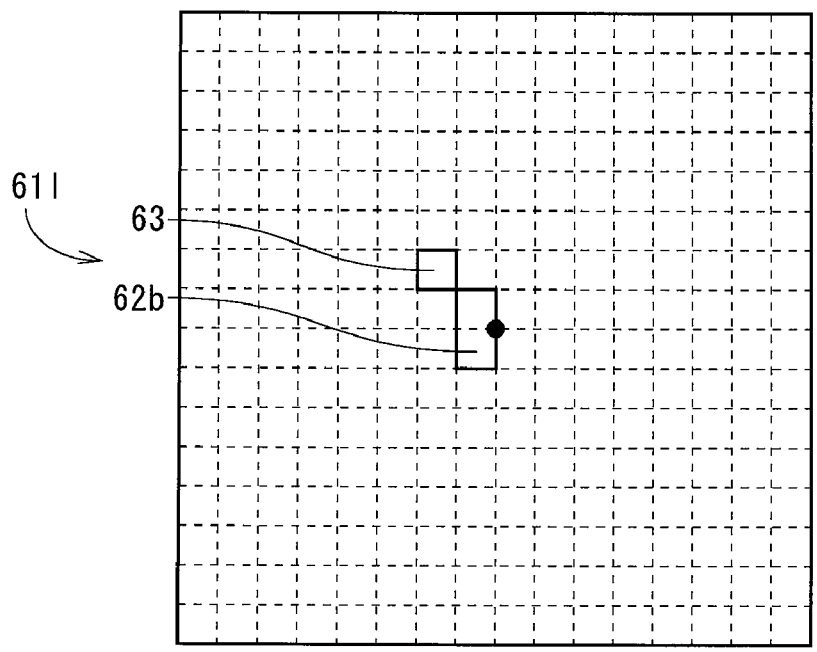

A minimum cluster 61k shown in FIG. 15H has the same main cluster 62a as that of FIG. 15E and two sub-clusters 63 each of which is one pixel, and only the vertices of the two sub-clusters 63 contact with the main cluster 62a. A minimum cluster 61l shown in FIG. 15I has a rectangular main cluster 62b consisting of two pixels and one sub-cluster 63 whose vertex contacts with the main cluster 62b. As shown in FIGS. 15H and 15I, since a halftone image is formed on a printing plate for letterpress printing with using a threshold matrix where the minimum clusters, each of which has the main cluster and one or more sub-clusters contacting the main cluster, are defined in a matrix space, the strength of reliefs corresponding to the minimum halftone dots (i.e., corresponding to the minimum clusters) is increased similarly to the above formation of the printing plate.

The minimum cluster 61 shown in FIG. 6 is regarded as a structure where the minimum cluster 61 has one main cluster 62 and one sub-cluster 63 similarly to the minimum cluster 61l shown in FIG. 15I, and further has three sub-clusters 63 which are the same form as the above sub-cluster 63 and located around the main cluster 62 radially, together with the sub-cluster 63. The minimum halftone dot 66 shown in FIG. 9A is regarded as a structure where the minimum halftone dot 66 has one main cluster 67 and one sub-cluster 68, and further has three sub-clusters 68 which are the same form as the above sub-cluster 68 and located around the main cluster 67 radially, together with the sub-cluster 68.

Though the preferred embodiment of the present invention has been discussed above, the present invention is not limited to the above-discussed preferred embodiment, but allows various variations.

The shape of halftone dots in the above halftone image is not limited to an approximate circle. For example, a halftone image having approximately ellipsoidal halftone dots (so-called elliptical dots) may be formed on a printing plate for letterpress printing.

In the above preferred embodiment, though a halftone image is generated by using the AM screening where gray levels are represented by changing the size of dots which are regularly arranged, generation of halftone image may be performed by using a so-called hybrid screening (i.e., a hybrid of the AM screening and an FM (Frequency Modulated) screening) where gray levels are represented by changing the size of dots which are arranged in a random fashion. In this case, a plurality of halftone cells 712 having an irregular form are arranged almost uniformly in a random fashion in a matrix space, and a plurality of minimum clusters 61 whose number is the same as that of the halftone cells 712 are defined almost uniformly spaced apart from one another in the matrix space in the above Step S12. The screen ruling of halftone dots B in representing the mode switching gray level in formation of halftone image as 100×C/((A/B)×(A/B)) % of the number of all gray levels G, is defined on the basis of the number of halftone dots per unit area.

In generation of the halftone image according to the above preferred embodiment, the mode switching gray level is 100× C/((A/B)×(A/B)) % of the number of all gray levels Q and the gray level of the original image is equal to that of the halftone image in a range of gray levels where the lowest gray level is equal to or higher than the mode switching gray level. However, the mode switching gray level is not limited to 100×C/ ((A/B)×(A/B)) % of G but may be a value, for example, which is larger than 100×C/((A/B)×(A/B)) % of G. In this case, the gray level where the minimum halftone dot 66 is defined in all the halftone cells 712 is higher in comparison with that of the above preferred embodiment, and increase of gray level of the halftone image is larger than that of the original image in a gray level which is higher than the mode switching gray level.

In the above-discussed threshold matrix, there may be a case where a plurality of halftone cells defined in a matrix space is divided into a group of a plurality of highlight-side halftone cells where a halftone dot area varies in accordance with change of gray level in the highlight side and a group of a plurality of shadow-side halftone cells where a halftone dot area varies in accordance with change of gray level in the shadow side, threshold values which are equal to or lower than half of the maximum gray level are assigned to the highlight-side halftone cells so as to become local minimum at the cell centers, and threshold values which are equal to or higher than half of the maximum gray level are assigned to the shadow-side halftone cells so as to become local maximum at the cell centers. As a result, when the gray level of the original image increases from 0% to 50%, the halftone dot area grows from the cell center in the highlight-side halftone cell and when the gray level increases from 50% to 100%, the halftone dot area grows from the peripheral portion of the shadow-side halftone cell towards the cell center (the blank dots are deflated towards the cell centers). Even in this case, the above-described minimum cluster is defined at the location including the cell center of the highlight-side halftone cell, to thereby increase the strength of relief corresponding to the minimum halftone dot.

The photosensitive resin layer 82 of the plate member 80 is not necessarily formed of photosensitive resin with UV curability, and may be formed of photosensitive resin which is cured by irradiation with light other than the UV light. The photosensitive resin layer 82 may be formed of photosensitive resin which is soluble by irradiation with the UV light or light other than the UV light. In a case where the photosensitive resin layer 82 is formed of photosensitive resin which is soluble by irradiation with light, the openings corresponding to the halftone image, which are formed in the mask layer 81 in the above Step S21, are made to portions excluding the halftone dots in the halftone image, and the exposed portions to be the cured portions of the photosensitive resin layer 82 in Step S22, are made to portions excluding the openings of the photosensitive resin layer 82.

The printing plate where the above halftone image is formed is not necessarily formed of photosensitive resin, and the above halftone image may be formed on a printing plate which is formed of other material such as metal.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2008-107584 filed in the Japan Patent Office on Apr. 17, 2008, the entire disclosure of which is incorporated herein by reference.

What is claimed is:

1. A halftone image generation method of generating a halftone image which is formed on a printing plate for letterpress printing, comprising the steps of:
    forming minimum halftone dots each of which consists of three or more pixels at predetermined halftone dot-central positions in a halftone area included in a halftone image generation space corresponding to a grayscale area included in a grayscale original image so that a density of minimum halftone dots is increased as a gray level of said grayscale area becomes higher, gray levels of said grayscale area being equal to or lower than a mode switching gray level which is determined, in advance, as a gray level close to the lowest gray level where any halftone dots do not exist; and
    forming halftone dots which grow from minimum halftone dots as a gray level of said original image becomes higher, at halftone dot-central positions in another halftone area included in said halftone image generation space corresponding to another grayscale area included in said original image, gray levels of said another grayscale area being higher than said mode switching gray level, wherein
    each of said minimum halftone dots comprises:
    a rectangular main cluster consisting of two or more pixels; and
    a sub-cluster located around said main cluster, the number of pixels of said sub-cluster being smaller than that of said main cluster, and
    said sub-cluster is one pixel or a plurality of pixels arranged approximately in a direction which extends from said main cluster, and
    only a vertex of said sub-cluster contacts with said main cluster or only a side of said sub-cluster contacts with a side of said main cluster, said side of said sub-cluster being shorter than said side of said main cluster.

2. The halftone image generation method according to claim 1, wherein
    said mode switching gray level is 100×C/((A/B)×(A/B)) % of G, where A is a resolution of a generated halftone image, B is a screen ruling of halftone dots per unit length corresponding to said resolution, C is the number of pixels of a minimum halftone dot, and G is the number of gray levels from the lowest gray level to the highest gray level.

3. The halftone image generation method according to claim 1, wherein
    said sub-cluster is smaller than said main cluster in a first direction parallel to a pair of sides of said main cluster and is smaller than said main cluster in a second direction perpendicular to said first direction.

4. The halftone image generation method according to claim 3, wherein
    said sub-cluster is a plurality of pixels arranged in line.

5. The halftone image generation method according to claim 4, wherein said minimum halftone dot further has three sub-clusters which are the same form as said sub-cluster and located around said main cluster radially, together with said sub-cluster.

6. The halftone image generation method according to claim 1, wherein
said sub-cluster is a plurality of pixels arranged in line.

7. The halftone image generation method according to claim 6, wherein
said minimum halftone dot further has three sub-clusters which are the same form as said sub-cluster and located around said main cluster radially, together with said sub-cluster.

8. The halftone image generation method according to claim 1, wherein
said minimum halftone dot further has three sub-clusters which are the same form as said sub-cluster and located around said main cluster radially, together with said sub-cluster.

9. A threshold matrix generation method of generating a threshold matrix which is compared with a grayscale original image in generating a halftone image to be formed on a printing plate for letterpress printing, comprising the steps of:
a) defining a plurality of minimum clusters each of which consists of three or more pixels almost uniformly spaced apart from one another in a matrix space for generating said threshold matrix;
b) assigning the same threshold value to all pixels included in a minimum cluster, and in a case of presence of the next minimum cluster, assigning a threshold value, which is larger than said same threshold value assigned to said minimum cluster by the number of pixels of a minimum cluster, to all pixels included in said next minimum cluster;
c) repeating said step b) to said plurality of minimum clusters sequentially; and
d) setting threshold values to an area excluding said plurality of minimum clusters in said matrix space so that halftone dot areas grow from a plurality of minimum halftone dots in a halftone image corresponding to said plurality of minimum clusters, in accordance with increase of gray level of an original image, and
each of said plurality of minimum clusters comprises:
a rectangular main cluster consisting of two or more pixels; and
a sub-cluster located around said main cluster, the number of pixels of said sub-cluster being smaller than that of said main cluster, and
said sub-cluster is one pixel or a plurality of pixels arranged approximately in a direction which extends from said main cluster, and
only a vertex of said sub-cluster contacts with said main cluster or only a side of said sub-cluster contacts with a side of said main cluster, said side of said sub-cluster being shorter than said side of said main cluster.

10. The threshold matrix generation method according to claim 9, wherein
said sub-cluster is smaller than said main cluster in a first direction parallel to a pair of sides of said main cluster and is smaller than said main cluster in a second direction perpendicular to said first direction.

11. The threshold matrix generation method according to claim 10, wherein
said sub-cluster is a plurality of pixels arranged in line.

12. The threshold matrix generation method according to claim 11, wherein
said minimum cluster further has three sub-clusters which are the same form as said sub-cluster and located around said main cluster radially, together with said sub-cluster.

13. The threshold matrix generation method according to claim 9, wherein
said sub-cluster is a plurality of pixels arranged in line.

14. The threshold matrix generation method according to claim 13, wherein
said minimum cluster further has three sub-clusters which are the same form as said sub-cluster and located around said main cluster radially, together with said sub-cluster.

15. The threshold matrix generation method according to claim 9, wherein
said minimum cluster further has three sub-clusters which are the same form as said sub-cluster and located around said main cluster radially, together with said sub-cluster.

16. A recording medium in which a threshold matrix is recorded, said threshold matrix being compared with a grayscale original image in generating a halftone image to be formed on a printing plate for letterpress printing, said threshold matrix being generated by a threshold matrix generation method comprising:
a) defining a plurality of minimum clusters each of which consists of three or more pixels almost uniformly spaced apart from one another in a matrix space for generating said threshold matrix;
b) assigning the same threshold value to all pixels included in a minimum cluster, and in a case of presence of the next minimum cluster, assigning a threshold value, which is larger than said same threshold value assigned to said minimum cluster by the number of pixels of a minimum cluster, to all pixels included in said next minimum cluster;
c) repeating said step b) to said plurality of minimum clusters sequentially; and
d) setting threshold values to an area excluding said plurality of minimum clusters in said matrix space so that halftone dot areas grow from a plurality of minimum halftone dots in a halftone image corresponding to said plurality of minimum clusters, in accordance with increase of gray level of an original image, and
each of said plurality of minimum clusters comprises:
a rectangular main cluster consisting of two or more pixels;
a sub-cluster located around said main cluster, the number of pixels of said sub-cluster being smaller than that of said main cluster, and
said sub-cluster is one pixel or a plurality of pixels arranged approximately in a direction which extends from said main cluster, and
only a vertex of said sub-cluster contacts with said main cluster or only a side of said sub-cluster contacts with a side of said main cluster, said side of said sub-cluster being shorter than said side of said main cluster.

17. A printing plate manufacturing method of forming a halftone image on a printing plate for letterpress printing, comprising:
forming openings corresponding to a halftone image, which is generated by a predetermined halftone image generation method, in a mask layer of a plate member in which said mask layer is laminated on a photosensitive resin layer;
applying light to said photosensitive resin layer through said openings to cure exposed portions of said photosensitive resin layer; and
forming a printing plate having convex portions corresponding to said halftone image by removing said mask layer and portions excluding cured portions of said photosensitive resin layer, wherein said halftone image generation method comprises:

forming minimum halftone dots each of which consists of three or more pixels at predetermined halftone dot-central positions in a halftone area included in a halftone image generation space corresponding to a grayscale area included in a grayscale original image so that a density of minimum halftone dots is increased as a gray level of said grayscale area becomes higher, gray levels of said grayscale area being equal to or lower than a mode switching gray level which is determined, in advance, as a gray level close to the lowest gray level where any halftone dots do not exist; and forming halftone dots which grow from minimum halftone dots as a gray level of said original image becomes higher, at halftone dot-central positions in another halftone area included in said halftone image generation space corresponding to another grayscale area included in said original image, gray levels of said another grayscale area being higher than said mode switching gray level, wherein each of said minimum halftone dots comprises:

a rectangular main cluster consisting of two or more pixels; and a sub-cluster located around said main cluster, the number of pixels of said sub-cluster being smaller than that of said main cluster, and said sub-cluster is one pixel or a plurality of pixels arranged approximately in a direction which extends from said main cluster, and only a vertex of said sub-cluster contacts with said main cluster or only a side of said sub-cluster contacts with a side of said main cluster, said side of said sub-cluster being shorter than said side of said main cluster.

18. A printing plate for letterpress printing in which a halftone image is formed by a printing plate manufacturing method, comprising:

forming openings corresponding to a halftone image, which is generated by a predetermined halftone image generation method, in a mask layer of a plate member in which said mask layer is laminated on a photosensitive resin layer;

applying light to said photosensitive resin layer through said openings to cure exposed portions of said photosensitive resin layer; and forming a printing plate having convex portions corresponding to said halftone image by removing said mask layer and portions excluding cured portions of said photosensitive resin layer, wherein said halftone image generation method comprises:

forming minimum halftone dots each of which consists of three or more pixels at predetermined halftone dot-central positions in a halftone area included in a halftone image generation space corresponding to a grayscale area included in a grayscale original image so that a density of minimum halftone dots is increased as a gray level of said grayscale area becomes higher, gray levels of said grayscale area being equal to or lower than a mode switching gray level which is determined, in advance, as a gray level close to the lowest gray level where any halftone dots do not exist; and forming halftone dots which grow from minimum halftone dots as a gray level of said original image becomes higher, at halftone dot-central positions in another halftone area included in said halftone image generation space corresponding to another grayscale area included in said original image, gray levels of said another grayscale area being higher than said mode switching gray level, wherein each of said minimum halftone dots comprises:

a rectangular main cluster consisting of two or more pixels; and a sub-cluster located around said main cluster, the number of pixels of said sub-cluster being smaller than that of said main cluster, and said sub-cluster is one pixel or a plurality of pixels arranged approximately in a direction which extends from said main cluster, and only a vertex of said sub-cluster contacts with said main cluster or only a side of said sub-cluster contacts with a side of said main cluster, said side of said sub-cluster being shorter than said side of said main cluster.

* * * * *